United States Patent
Hosoi

(10) Patent No.: US 8,103,091 B2
(45) Date of Patent: Jan. 24, 2012

(54) OBJECT IDENTIFICATION PARAMETER LEARNING SYSTEM

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 1135 days.

(21) Appl. No.: 11/892,740

(22) Filed: Aug. 27, 2007

(65) Prior Publication Data

US 2008/0056562 A1 Mar. 6, 2008

(30) Foreign Application Priority Data

Aug. 30, 2006 (JP) ................................ 2006-233016

(51) Int. Cl.
G06K 9/00 (2006.01)
(52) U.S. Cl. ........ 382/157; 382/159; 382/173; 382/190; 382/195
(58) Field of Classification Search .................. 382/103, 382/155–161, 164, 165, 173, 181, 190–208
See application file for complete search history.

(56) References Cited

U.S. PATENT DOCUMENTS

| | | | | |
|---|---|---|---|---|
| 6,647,131 B1 * | 11/2003 | Bradski | .......................... | 382/107 |
| 2004/0066966 A1 * | 4/2004 | Schneiderman | ............... | 382/159 |

FOREIGN PATENT DOCUMENTS

| | | |
|---|---|---|
| JP | 7-302328 | 11/1995 |
| JP | 11-203481 | 7/1999 |
| JP | 2002-32751 | 1/2002 |
| JP | 2003-169281 | 6/2003 |
| JP | 2005-285011 | 10/2005 |

OTHER PUBLICATIONS

Hosoi et al., "An object classification method based on moving region's appearance," FIT2006 (The 5th Forum on Information Technology), Japan, Institute of Electronics, Information and Communication Engineers, Information Processing Society of Japan, Aug. 21, 2006, Translated by the McElroyTranslation Company.*

Japanese Office Action dated Dec. 14, 2010, with partial English translation.

Hosoi, et al., "An object classification method based on moving region's appearance," FIT2006 (The 5th Forum on Information Technology), Japan, Institute of Electronics, Information and Communication Engineers, Information Processing Society of Japan, Aug. 21, 2006, pp. 71-72.

(Continued)

*Primary Examiner* — Wesley Tucker
(74) *Attorney, Agent, or Firm* — McGinn IP Law Group PLLC

(57) ABSTRACT

It is to learn an object identification parameter while suppressing an influence of the background area. The object identification parameter learning system includes: a feature extracting device for obtaining a feature of an object from the image; a background specifying device for specifying a background area of the image; a background replacing device which replaces feature components corresponding to the background area of the feature with other values; and an identification parameter update device for updating the identification parameter based on the feature components replaced by the background replacing device. The identification parameter can be learnt by generating a plurality of pieces of feature data of the object with different backgrounds from a single object image through replacing the background area of the feature of the object.

25 Claims, 14 Drawing Sheets

OTHER PUBLICATIONS

"A system for Video Surveillance and Monitoring: VSAM Final Report" by Collins, Lipton, Kanade, Fujiyoshi, Duggins, Tsin, Tolliver, Enomoto, and Hasegawa, Technical report CMU-RI-TR-00-12, Robotics Institute, Carnegie Mellon University, Mar. 2000).

"A Statical Method for 3D Object Detection Applied to Faces and Cars" by H. Schneiderman, T. Kanade, Proceeding of IEEE Conference on Computer Vision and Pattern Recognition, vol. 1, p. 1746, 2000).

"Character Recognition using Generalized Learning Vector Quantization" by Atsushi Sato, IEICE Technical Report, PRU95-219, 1996).

* cited by examiner

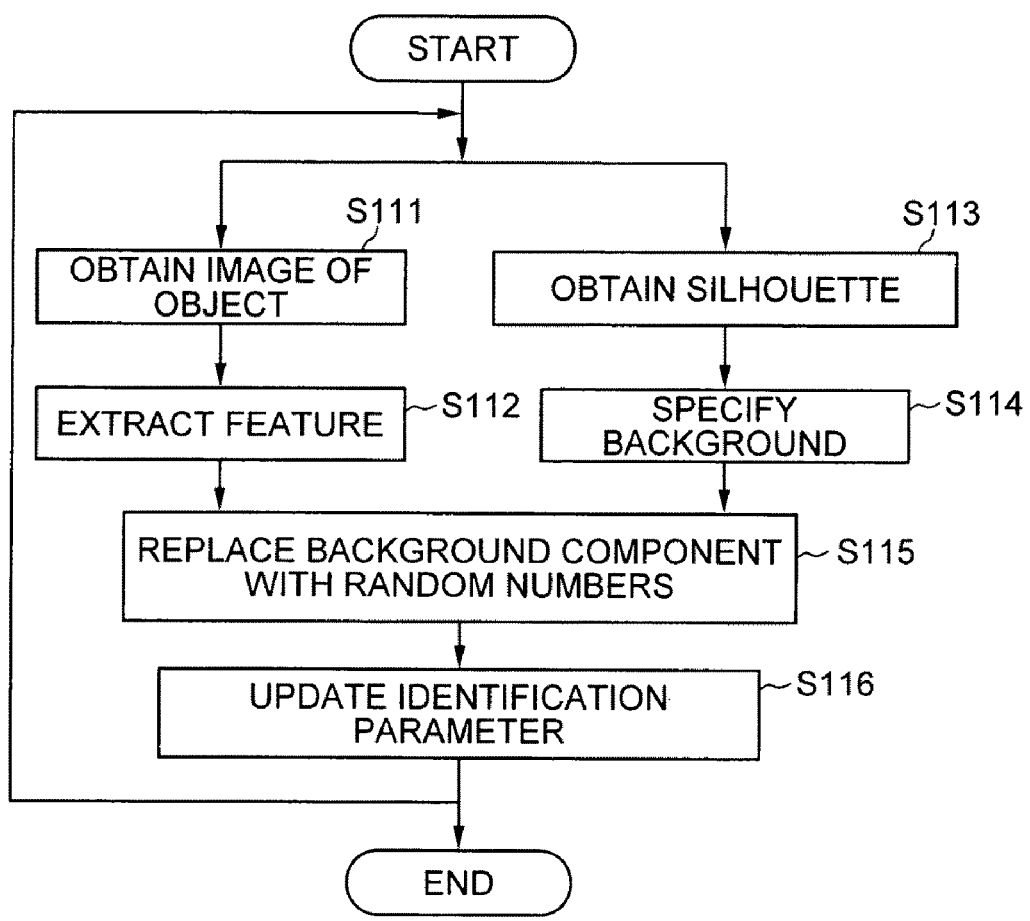

FIG. 5A
FIG. 5B
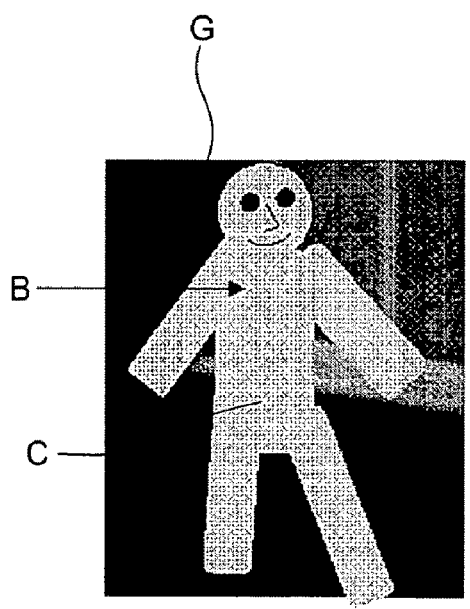
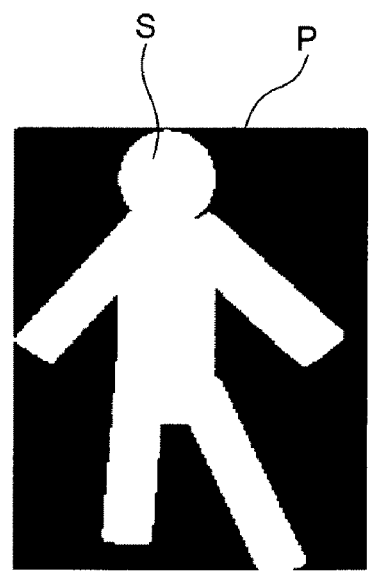

OBJECT IDENTIFICATION PARAMETER LEARNING SYSTEM

BACKGROUND OF THE INVENTION

1. Field of the Invention

This application is based upon and claims the benefit of priority from Japanese patent application No. 2006-233016, filed on Aug. 30, 2006, the disclosure of which is incorporated herein in its entirety by reference.

The present invention relates to a system, a method, and a program for learning a parameter for identifying the type of an object in a video. More specifically, the present invention relates to an object identification parameter learning system, an object identification parameter learning method, and an object identification parameter learning program, which can identify the type of the object highly efficiently without being easily affected by the background.

2. Description of the Related Art

A method to specify an area with an object from a video, which corresponds to preprocessing for identifying an object, has already been proposed. For example, a method depicted in Non-patent Document 1 ("A system for Video Surveillance and Monitoring: VSAM Final Report" by Collins, Lipton, Kanade, Fujiyoshi, Duggins, Tsin, Tolliver, Enomoto, and Hasegawa, Technical report CMU-RI-TR-00-12, Robotics Institute, Carnegie Mellon University, March 2000) is capable of obtaining a silhouette and a circumscribed rectangle of an object on an image based on a change in the luminance of pixels in time-series images.

Japanese Unexamined Patent Publication 2005-285011 (Patent Document 1) and Non-patent Document 1 disclose conventional simple methods for identifying the type of an object, for the case where it is already known that there is an object within a specific area as mentioned above. The method of Patent Document 1 identifies the type based on a size of the object on the image. The method of Non-patent Document 1 identifies the type by using an aspect ratio of an area of the object on the image. Even though the processing of those two methods is simple, it depends largely on the placed condition of an image input device such as a camera. In addition, it lacks information for identifying the type clearly. Therefore, it is not possible to achieve a high identification performance.

Incidentally, Non-patent Document 1 also discloses an identifying method using a silhouette of an object. This method finds the centroid of a silhouette of an object, and a distance between the object and a dot sequence on a boundary line of the background. Then, the method identifies whether the object is a pedestrian, a vehicle, or something else, based on an increase or decrease in a distance value when making a round of the dot sequence in a clockwise direction. This method is capable of achieving a high identification performance when the silhouette shape such as the head part and the limbs of a person can be obtained clearly. However, it is difficult with this method to identify a target whose silhouette shape is unclear, such as a person who is making a move other than walking.

Japanese Unexamined Patent Publication H11-203481 (Patent Document 2) discloses a method for identifying an object based on a motion vector of the object. This method finds motion vectors by each small area within the area of the object, and identifies whether the object is a person or a vehicle based on the uniformity in the group of motion vectors. This method utilizes such characteristic that the motion vectors within the area are not uniform when a person moves therein, while the motion vectors are uniform in the case of a vehicle. Therefore, this method is not suitable for identifying other types of objects. Further, it is also an issue that the object cannot be identified when the object temporarily stands still in the video, since the motion vector cannot be obtained.

Non-patent Document 2 ("A Statistical Method for 3D Object Detection Applied to Faces and Cars" by H. Schneiderman, T. Kanade, Proceeding of IEEE Conference on Computer Vision and Pattern Recognition, Volume 1, p. 1746, 2000) discloses a method for identifying the type of an object through a statistical pattern recognition technique based on the texture of the object on an image, that is, based on the appearance of the object. This method is capable of obtaining a high identification performance. However, the identification performance is affected by a fluctuation in the background, since this method identifies not only the object itself but also the image including the background.

Examples of the typical statistical pattern recognition technique are the learning vector quantization, neural network, support vector machine, subspace method, optimization of identification functions, K-nearest neighbor identifying method, decision tree, hidden Markovian model, and boosting.

Among those, the learning vector quantization is described in detail in Non-Patent Document 3 ("Character Recognition using Generalized Learning Vector Quantization" by Atsushi Sato, IEICE Technical Report, PRU95-219, 1996). In the statistical pattern recognition method, a parameter used for identification is obtained by using a large number of learning samples and teacher data that expresses the types of the learning samples. Hereinafter, the action to obtain this identification parameter is expressed as "learning".

The conventional object identifying methods have at least one of the three issues described below.

The first issue is that the identification performance achieved thereby is not high.

The reason for this is that information used for identification is evidently insufficient with the methods that are too simple.

The second issue is that the targets to be identified are limited.

The reason for this is that those methods utilize the characters that are limited to pedestrians and vehicles.

The third issue is that the identification performance thereof is easily affected by the backgrounds.

The reason for this is that those methods identify the object while including the information of the background that is irrelevant to the object.

SUMMARY OF THE INVENTION

An exemplary object of the present invention is to provide an object identification system which is not easily affected by the background and is capable of identifying the object highly efficiently.

In order to achieve the foregoing exemplary object, the object identification parameter learning system according to an exemplary aspect of the present invention is an object identification parameter learning system for learning an identification parameter used for identifying an object in an image by using a feature of the object extracted from the image. The system includes:

a feature extracting device for extracting the feature of the object from the image;

a background specifying device for specifying a background area of the image from which the object as an identification target is eliminated;

a background replacing device which outputs the feature of the object with replaced background area as a learning sample by replacing components corresponding to the background area specified by the background specifying device for the extracted feature of the object; and an identification parameter update device for updating the identification parameter used for identifying the object based on the learning sample.

The present invention is not limited to the object identification parameter learning system as hardware. It may also be configured as an object identification parameter learning program as software and as object identification parameter learning method.

The object identification parameter learning program according to an exemplary aspect of the present invention is configured to allow a computer, which configures an object identification parameter learning system for learning an identification parameter used for identifying an object in an image by using a feature of the object extracted from the image, to execute:

a function for extracting the feature of the object from the image;

a function for specifying a background area of the image from which the object as an identification target is eliminated; and a function for replacing components corresponding to the background area specified by the background specifying device for the extracted feature of the object, and outputting the feature of the object with replaced background area as a learning sample.

The object identification parameter learning method according an exemplary aspect of to the present invention is a learning method for learning an identification parameter used for identifying an object in an image by using a feature of the object extracted from the image. The method includes the steps of:

a feature extracting step for extracting a feature of the object from the image;

a background specifying step for specifying a background area of the image from which the object as an identification target is eliminated; and a background replacing step which replaces components corresponding to the background area specified by the background specifying device for the extracted feature of the object, and outputs the feature of the object with replaced background area as a learning sample.

As an exemplary advantage according to the invention, it is possible to identify an object within an image with a high identification capacity.

BRIEF DESCRIPTION OF THE DRAWINGS

FIG. 4 is a flowchart for showing the operation of the first exemplary embodiment according to the present invention;

FIG. 5A is a schematic illustration for showing an example of an object area, and FIG. 5B is a schematic illustration for showing an example of a silhouette of the object;

DETAILED DESCRIPTION OF THE EXEMPLARY EMBODIMENTS

Hereinafter, exemplary embodiments of the present invention will be described in detail by referring to the accompanying drawings.

Figure 1:
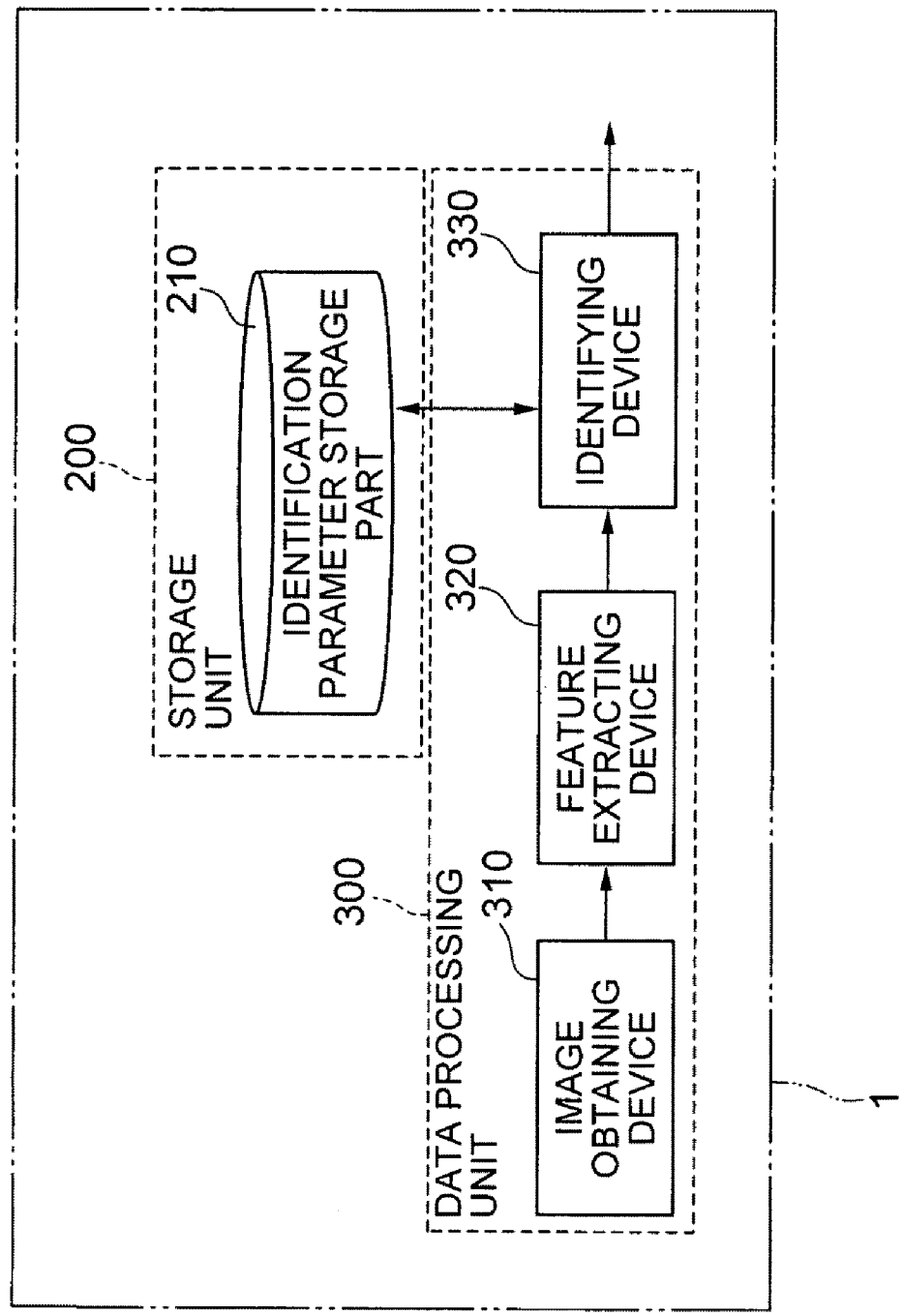
FIG. 1 is a block diagram of an identification system for identifying an object by using an identification parameter that is obtained by an exemplary embodiment of the present invention.

An identification parameter obtained by using an object identification parameter learning system according to the exemplary embodiments of the present invention is employed to an identification system 1 that is shown in FIG. 1.

As shown in FIG. 1, the identification system 1 includes a storage unit 200 and a data processing unit 300.

The storage unit 200 includes an identification parameter storage device 210 for keeping the identification parameter that is obtained by using the object identification parameter learning system according to the exemplary embodiment of the present invention. The data processing unit 300 includes an image obtaining device 310, a feature extracting device 320, and an identifying device 330.

The image obtaining device 310 obtains an image including an object that is a target to be identified. The feature extracting device 320 extracts a feature for identifying the object from the image that is obtain by the image obtaining device 310. The identifying device 330 identifies the object within the image based on the identification parameter that is stored in the identification parameter storage part 210.

Figure 2:
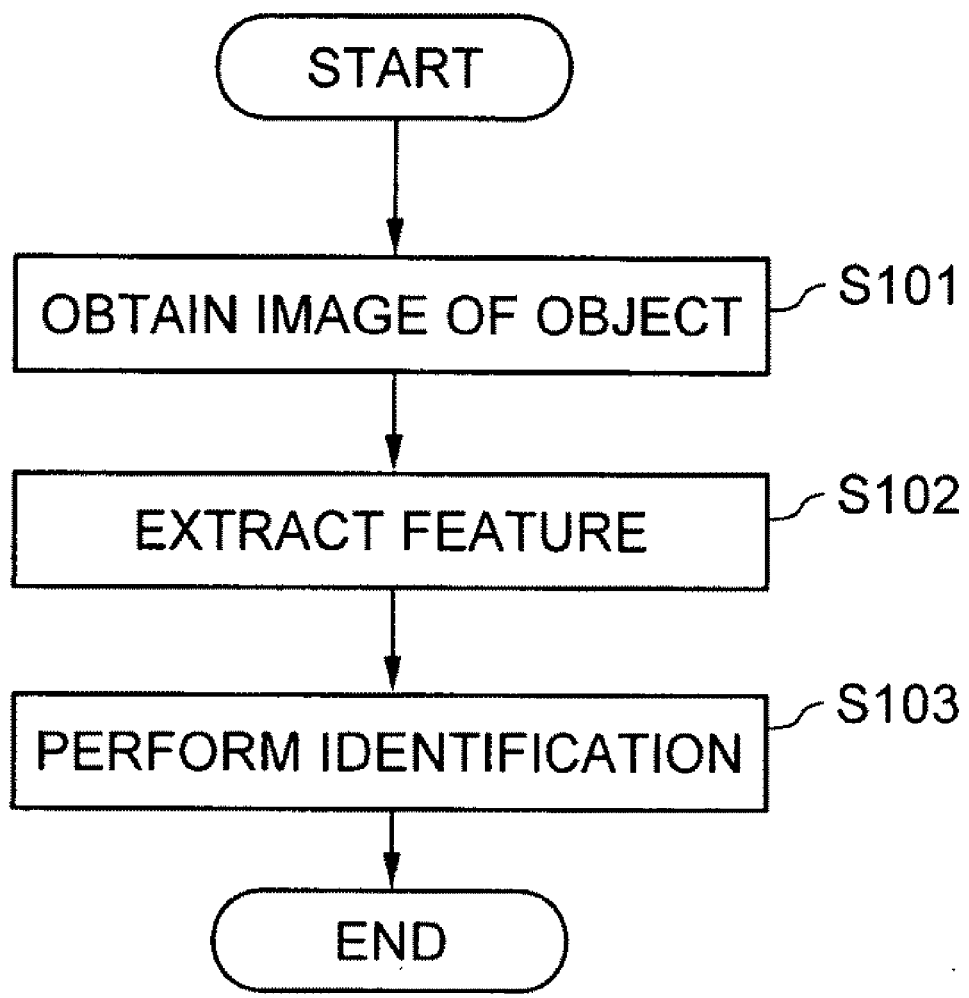
FIG. 2 is a flowchart of the identification system for identifying an object by using an identification parameter that is obtained by the exemplary embodiment of the present invention.

The identification system 1 shown in FIG. 1 identifies the object according to the order of processing shown in FIG. 2. Specifically, the image obtaining device 310 obtains an image of the object whose type is to be identified (step S101 of FIG. 2). The feature extracting device 320 extracts a feature for identifying the object from the image obtained by the image obtaining device 310 (step S102 of FIG. 2). The feature extracting device 320 employs an object feature extracting method that is used in the object identification parameter learning system according to the exemplary embodiment of the present invention that will be described later.

The identifying device 330 identifies the type of the object by using the identification parameter read out from the identification parameter storage part 210 based on the feature obtained by the feature extracting device 320. As a method for the identifying device 330 to identify the type of the object by using the identification parameter, there is a statistical pattern recognition method that utilizes a learned identification parameter. An example of the statistical pattern recognition method is disclosed in Non-patent Document 3, which performs identification by a generalized learning vector quantization. The method of Non-patent Document 3 uses a quantized reference vector as the identification parameter.

First Exemplary Embodiment

An object identification parameter learning system according to a first exemplary embodiment of the present invention will be described by referring to FIG. 3.

Figure 3:
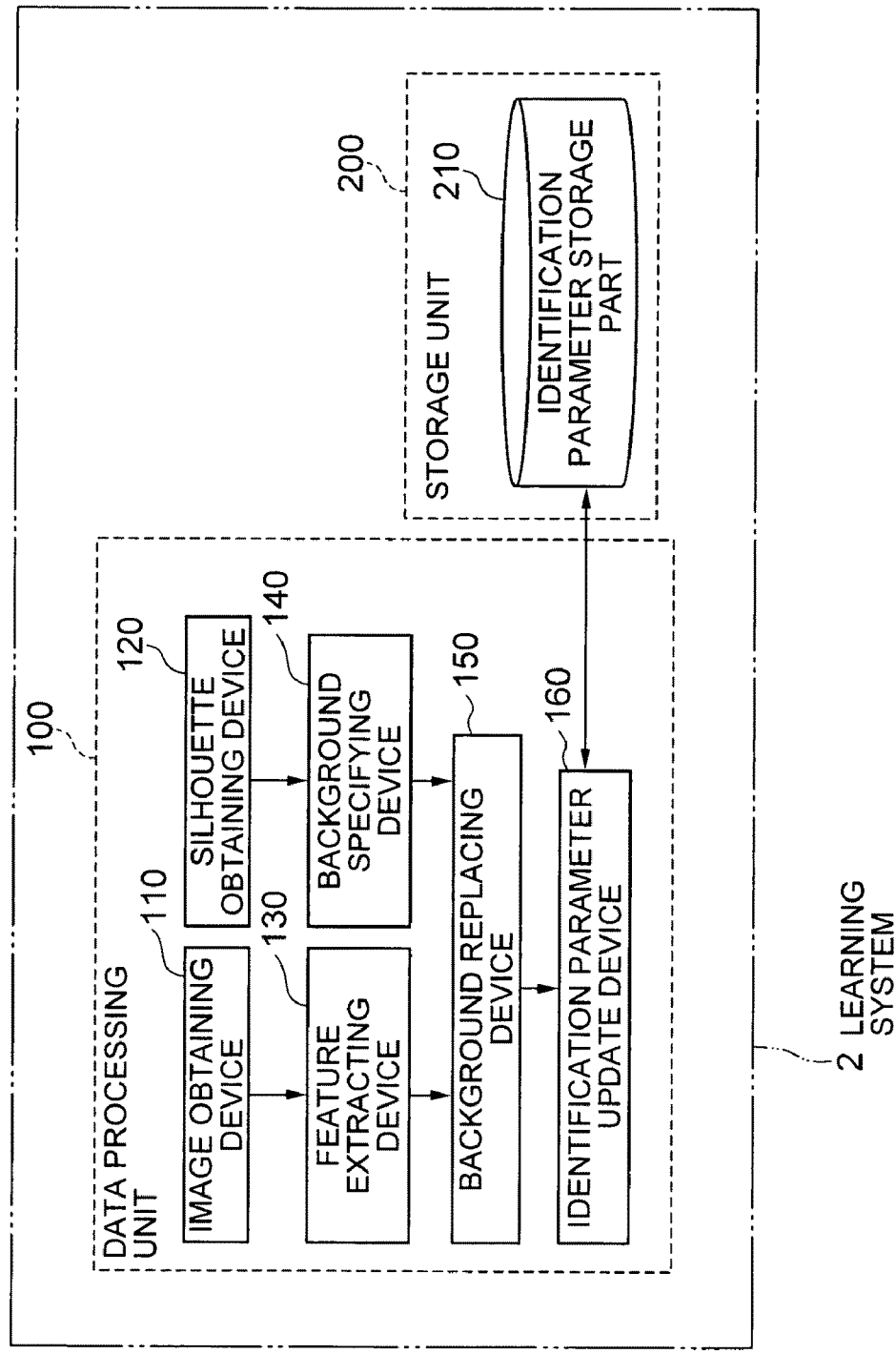
FIG. 3 is a block diagram for showing a structure of a first exemplary embodiment according to the present invention.

As shown in FIG. 3, an object identification parameter learning system 2 according to the first exemplary embodiment of the present invention includes a data processing unit 100 and a storage unit 200.

As shown in FIG. 3, the data processing unit 100 includes an image obtaining device 110, a silhouette obtaining device 120, a feature extracting device 130, a background specifying device 140, a background replacing device 150, and an identification parameter update device 160. As shown in FIG. 3, the storage unit 200 includes an identification parameter storage part 210.

The image obtaining device 110 obtains a partial image (an area with the object captured therein) which is cut out from the image. The image obtaining device 110 is not limited to photograph an object by itself and obtains the partial image from the photographed image, but may obtain data of a partial image from outside.

The silhouette obtaining device 120 obtains a silhouette image of the object from the image. The silhouette obtaining device 120 is not limited to photograph an object by itself and obtains the silhouette image from the photographed image, but may obtain data of the silhouette from outside.

The feature extracting device 130 extracts, from the partial image, a feature of the object to be used for identifying the type of the object. The feature extracting device 130 employs a widely-used method for extracting the feature of the object from the partial image, and this exemplary embodiment of the present invention is not distinctive regarding extraction of the feature of the object. Thus, detailed explanations thereof are omitted.

The background specifying device 140 specifies an area (background area), which corresponds to a background obtained by eliminating the object from the silhouette image, within the partial image. The background specifying device 140 is distinctive in respect that it specifies a background area within the image. However, the background specifying device 140 has no specific characteristic in the structure itself for specifying a specific area within the image. Thus, detailed explanations regarding the structure itself for specifying a specific area within the image are omitted in the exemplary embodiment of the present invention.

Regarding the feature of the object extracted by the feature extracting device 130, the background replacing device 150 replaces the components that correspond to the background area specified by the background specifying device 140, and outputs, as a learning sample, the feature of the object whose background is replaced. The background replacing device 150 according to the first exemplary embodiment of the present invention shown in FIG. 3 is configured as a structure which outputs a plurality of types of object features with replaced background areas as the learning samples (see FIG. 6) for the extracted feature of the object.

The identification parameter update device 160 updates the identification parameter for identifying the object based on the learning samples outputted from the background replacing device 150, and outputs the updated identification parameter to the identification parameter storage part 210 of the storage unit 200. The identification parameter storage part 210 of the storage unit 200 keeps the identification parameter used for identification.

By referring to FIG. 3 and FIG. 4, there is described a case where the identification parameter for identifying the object within the image is learnt by using the feature of the object that is extracted from the image with the use of the object identification parameter learning system according to the first exemplary embodiment of the present invention that is shown in FIG. 3.

In FIG. 3, the image obtaining device 110 obtains an image of a partial area (partial image) that includes an object as a target to be identified (step S111 of FIG. 4).

Upon receiving the partial image from the image obtaining device 110, the feature extracting device 130 extracts a feature for identifying the type of the object from the partial image (step S112 of FIG. 4).

In parallel to the above-described action (or before or after the action), the silhouette obtaining device 120 receives the partial image that is obtain by the image obtaining device 110, and obtains silhouette information of the object (step S113 of FIG. 4). The silhouette information may be obtained as a silhouette image. The silhouette obtaining device 120 is distinctive in respect that it obtains the silhouette information from the partial image. However, the silhouette obtaining device 120 has no specific characteristic in the structure itself for obtaining the silhouette information of the object from the image. Thus, detailed explanations regarding the structure itself thereof for obtaining the silhouette information of the object from the image are omitted in the exemplary embodiment of the present invention. The structure itself for obtaining the silhouette information of the object from the image is disclosed in Patent Document 1, for example.

Upon receiving the silhouette information from the silhouette obtaining device 120, the background specifying device 140 specifies a background area that is obtained by eliminating the object as the identification target from the silhouette information (step S114 of FIG. 4).

Next, relations regarding the partial image obtained by the image obtaining device 110, the feature of the object extracted by the feature extracting device 130, the silhouette information obtained by the silhouette obtaining device 120, and the background area specified by the background specifying device 140 will be described in a specific way by referring to FIG. 5.

The partial image obtained by the image obtaining device 110 is a rectangular image G that circumscribes an object B shown in FIG. 5A. A feature C of the object B extracted by the feature extracting device 130 is illustrated by changing the luminosity on the drawing shown in FIG. 5A. In FIG. 5A, the object B is a person. The feature C of the object B is an area specified by the contours of the person (the object B), and the area specified by the contours of the object B is illustrated by changing the luminosity from that of the background area.

The silhouette information (image) S obtained by the silhouette obtaining device 120 is an area illustrated in white in FIG. 5B. The background area P specified by the background specifying device 140 is an area illustrated in black in FIG. 5B.

The silhouette image S is the information for judging whether an arbitrary point on the image is an object or a background. Thus, the silhouette information S is not limited to be in the form shown in FIG. 5B. For example, it may be in a form where black and white are inverted from those of FIG.

5B, and the black area in the inverted state may be the silhouette information S and the white area may be the background area P. Further, the resolution of the silhouette information S shown in FIG. 5B may be lower than the resolution of the object B obtained in the partial image of FIG. 5A.

Figure 6:
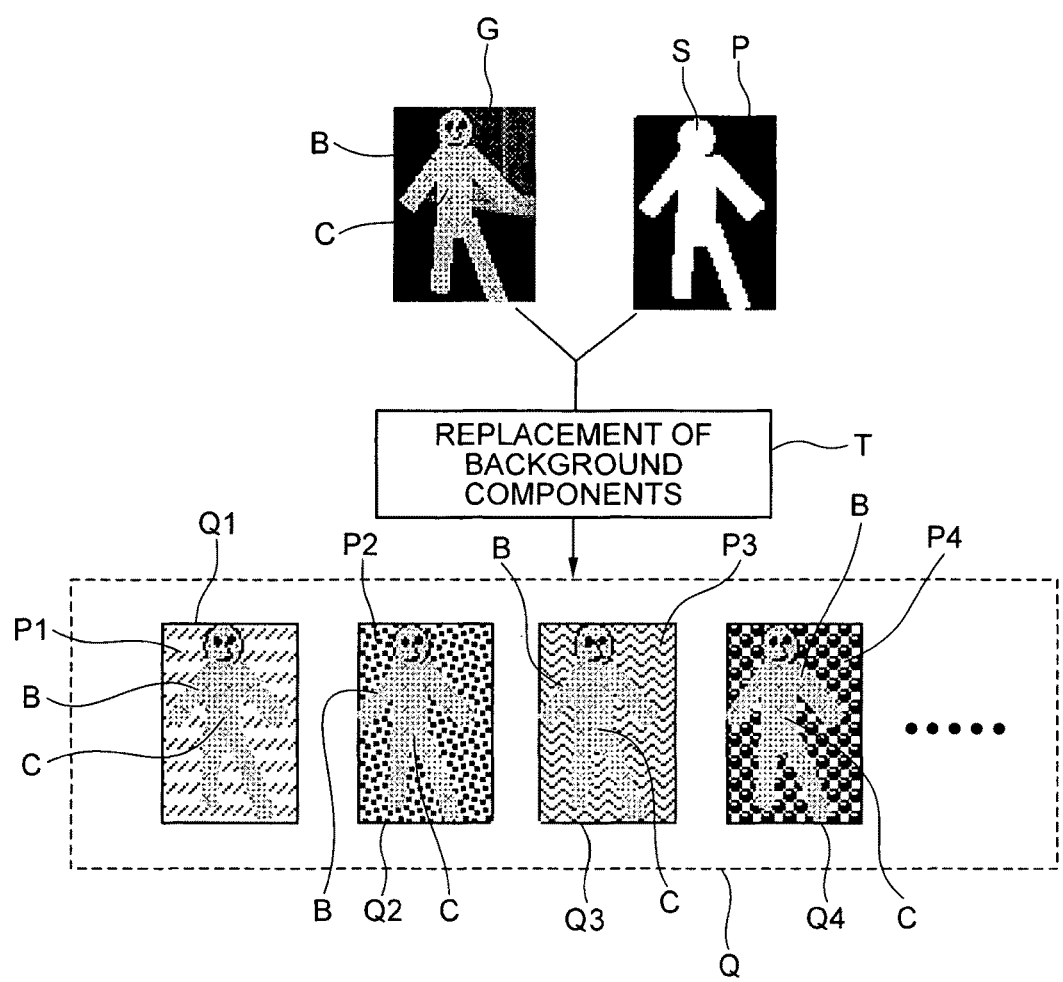
FIG. 6 is a schematic illustration for showing an example of the case where background components are replaced with random numbers.

As shown in FIG. 6, the background replacing device 150 replaces components that correspond to the background area specified by the background specifying device 140 for the feature of the object extracted by the feature extracting device 130 (background component replacement T), and outputs the feature of the object with the replaced background area as a learning sample. The background replacing device 150 shown in FIG. 3 outputs, as learning samples Q, a plurality of kinds of object features shown in FIG. 6 where the background of the feature of the object is replaced (step S115 of FIG. 4).

Specifically, as shown in FIG. 6, the background replacing device 150 obtains information of the feature C of the object B extracted from the partial image G and information of the background area P, replaces the background components of the background area P, and outputs a plurality of types of object features shown in FIG. 6 (where the background area of the feature of the object is replaced) as the learning samples Q for the extracted feature of the object.

In FIG. 6, a learning sample Q1 among the learning samples Q has the black background area P of the partial image replaced with a background area P1 with oblique lines. A learning sample Q2 has the black background area P of the partial image replaced with a background area P2 with small dots. A learning sample Q3 has the black background area P of the partial image replaced with a background area P3 with wavy lines. A learning sample Q4 has the black background area P of the partial image replaced with a background area P4 with large dots. The learning samples Q are not limited to the four kinds of learning samples Q1, Q2, Q3, and Q4 shown in FIG. 6.

The background replacing device 150 replaces the background components of the background area P by using random numbers. Further, for executing the processing of the step S114, it is necessary to specify values that correspond to the background area (obtained in the step S113) of the feature (extracted in the step S112). A widely-used technique is used for specifying the values that correspond to the background area P of the feature C, so that the details thereof are omitted. When replacing the background components of the background area P with random numbers, it is possible to replace the components with perfect random numbers or with values obtained by adding or subtracting the random numbers from the values before being replaced. Furthermore, the random numbers to be used may be uniform random numbers or may be random numbers with a deviated distribution, such as normal distribution random numbers.

The identification parameter update device 160 updates the identification parameter for identifying the object based on the learning samples outputted from the background replacing device 150 (step S116 of FIG. 4), and outputs the updated identification parameter to the identification parameter storage part 210 of the storage unit 200. The identification parameter storage part 210 of the storage unit 200 keeps the identification parameter that is used for identification.

After the identification parameter update device 160 updates the identification parameter, the action of the object identification parameter learning system is initialized so as to be shifted to an initial action state (that is, the state capable of starting the processing of the steps S111 and S113 shown in FIG. 4).

Further, in FIG. 4, the identification parameter update device 160 updates, in the step S116, the identification parameter by using one or more pieces of feature data outputted in the step S115. However, it is not limited to that case. For example, it is also possible to output the learning samples Q1, Q2, Q3, and Q4 shown in FIG. 6 with a time lag from each other for the feature data of a single object, and to update the identification parameter by each of the learning samples Q1, Q2, Q3, and Q4.

With the first exemplary embodiment of the present invention as described above, the background components of the background area (where the object is eliminated) of the feature of the object contained in the image are replaced, and every feature data of the object with respective replaced background area is utilized to learn the identification parameter. Therefore, it is possible to obtain the identification parameter while suppressing an influence of changes in the background.

With the first exemplary embodiment of the present invention, the identification parameter is updated by utilizing the feature data that is extracted based on the image of the object and the silhouette information. Therefore, it is possible to achieve a high identification performance than the case where the size and the aspect ratio of the object are simply used. In addition, it is possible to identify objects other than the specific objects such as a pedestrian and a vehicle.

With the first exemplary embodiment of the present invention, identification is performed statistically by using a large amount of information for identification such as the image and silhouette of the image. Therefore, a high identification performance can be achieved.

With the first exemplary embodiment of the present invention, an object is identified not based on a limited characteristic of a specific object such as a pedestrian or a vehicle but based on a relatively normal characteristic such as the appearance of the object. Therefore, the targets to be identified can be broadly expanded.

With the first exemplary embodiment of the present invention, the identification parameter is updated by replacing the feature components that correspond to the background area. Through this, it becomes possible to obtain the identification parameter by suppressing the dependency to the background that is irrelevant to the object. This makes it possible for the object identification performance to be less susceptible to an influence of the background.

Second Exemplary Embodiment

Next, an object identification parameter learning system according to a second exemplary embodiment of the present invention will be described by referring to FIG. 7, FIG. 8, and FIG. 9.

It may also be possible to achieve the learning with a suppressed influence of the background, by randomly replacing the pixel values of the background of the inputted object image in advance. However, depending on the type of the feature of the object in the image, the background components of the background area after extracting the feature of the object may not become random. Thus, there may be cases where the influence of the background cannot be suppressed even if the statistical learning is performed. Examples of an image including such object feature data may be edge images and differential intensity images obtained by using the Sobel operator based on the concentration gradient directions.

The object identification parameter learning system according to the second exemplary embodiment of the present invention is for dealing with the images mentioned above.

Figure 7:
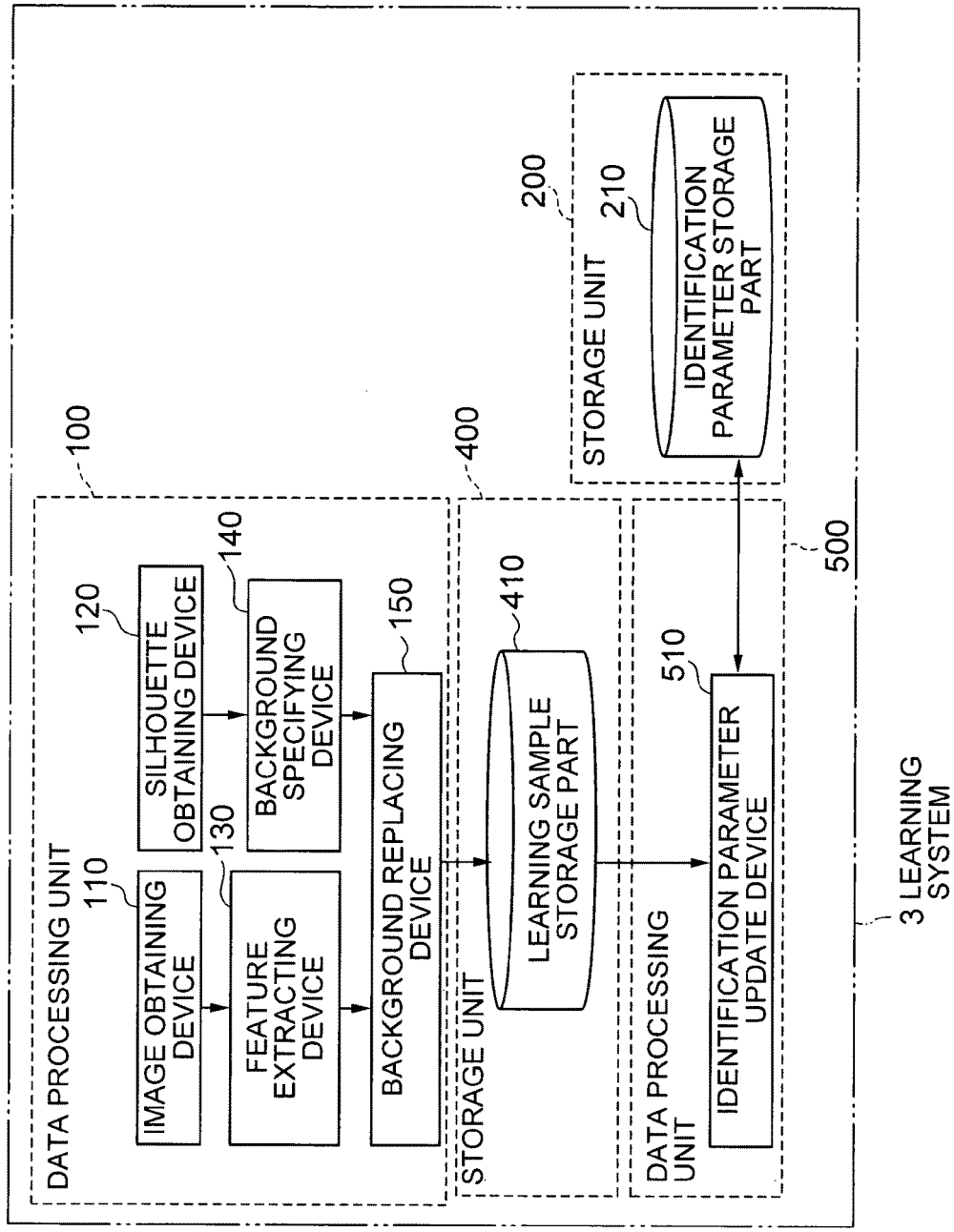
FIG. 7 is a block diagram for showing a structure of a second exemplary embodiment according to the present invention.

As shown in FIG. 7, the object identification parameter learning system 3 according to the second exemplary embodiment of the present invention includes a first data processing unit 100, a first storage unit 400, a second data processing unit 500, and a second storage unit 200.

The data processing unit 100 includes an image obtaining device 110, a silhouette obtaining device 120, a feature extracting device 130, a background specifying device 140, and a background replacing device 150. The storage unit 400 includes a learning sample storage part 410. The data processing unit 500 includes an identification parameter update device 510. The storage unit 200 includes an identification parameter storage part 210.

In FIG. 7, the first data processing unit 100 and the second data processing unit 500 are illustrated as separate structures. However, as shown in FIG. 3, the first data processing unit 100 and the second data processing unit 500 may be structured integrally from the functional view point. Further, in FIG. 7, the first storage unit 400 and the second storage unit 200 are illustrated as separate structures. However, the learning sample storage part 410 of the first storage unit 400 may be secured within the storage area of the second storage unit 200.

The image obtaining device 110, the silhouette obtaining device 120, the feature extracting device 130, and the background replacing device 150 shown in FIG. 7 are in the same structures as those of the image obtaining device 110, the silhouette obtaining device 120, the feature extracting device 130, and the background replacing device 150 shown in FIG. 3.

The learning sample storage part 410 keeps the data of the learning samples Q (Q1, Q2, Q3, Q4) shown in FIG. 6 where the background components of the background area are replaced. The identification parameter update device 510 updates the identification parameter stored in the identification parameter storage part 210 based on the data of the learning samples Q (Q1, Q2, Q3, Q4) shown in FIG. 6 where the background components of the background area are replaced by the background replacing device 150. The identification parameter storage part 210 keeps the parameter that is used for identification.

Figure 8:
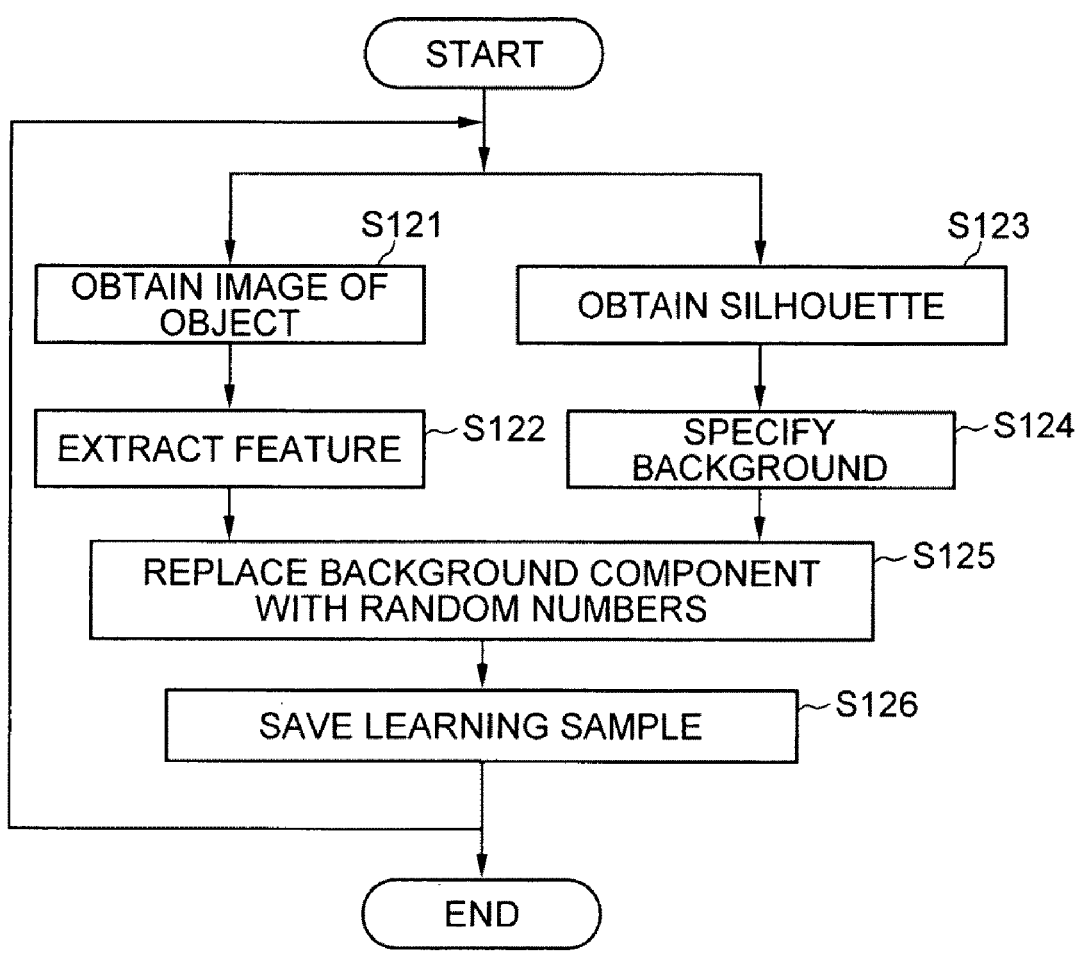
FIG. 8 is a flowchart for showing a first half of the operation of the second exemplary embodiment according to the present invention.
Figure 9:
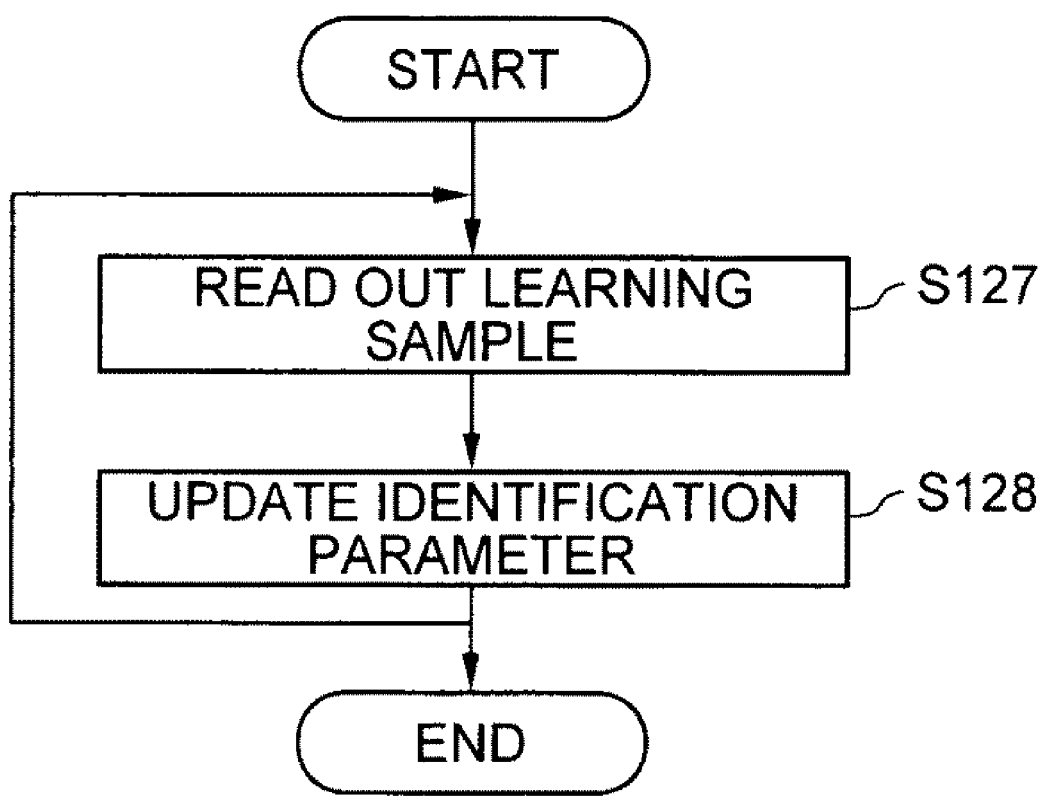
FIG. 9 is a flowchart for showing a latter half of the operation of the second exemplary embodiment according to the present invention.

By referring to FIG. 7, FIG. 8, and FIG. 9, there is described a case where the identification parameter for identifying the object within the image is learnt by using the feature of the object that is extracted from the image with the use of the object identification parameter learning system according to the second exemplary embodiment of the present invention that is shown in FIG. 7.

The processing executed in the object identification parameter learning system according to the second exemplary embodiment of the present invention shown in FIG. 7 can be divided into to the processing of FIG. 8 and the processing of FIG. 9. The processing shown in FIG. 8 is executed for generating and saving a learning sample for updating the identification parameter. The processing shown in FIG. 9 is executed for updating the identification parameter by reading out the saved learning sample.

In FIG. 7, the image obtaining device 110 obtains an image of a partial area (partial image) that includes an object as a target to be identified (step S121 of FIG. 8).

Upon receiving the partial image from the image obtaining device 110, the feature extracting device 130 extracts a feature for identifying the type of the object from the partial image (step S122 of FIG. 8).

In parallel to the above-described action (or before or after the action), the silhouette obtaining device 120 receives the partial image that is obtained by the image obtaining device 110, and obtains silhouette information of the object (step S123 of FIG. 8).

Upon receiving the silhouette information from the silhouette obtaining device 120, the background specifying device 140 specifies a background area that is obtained by eliminating the object as the identification target from the silhouette information (step S124 of FIG. 8).

Upon receiving the object feature data from the feature extracting device 130 and the background area information from the background specifying device 140, the background replacing device 150 replaces the values, which correspond to the background components of the background area of the object feature extracted with the feature extracting device 130, with random numbers. Further, the background replacing device 150 outputs a plurality of types of object features shown in FIG. 6 where the background area is replaced as the learning samples Q for the feature data of a single object (step S125 of FIG. 8).

In order for the background replacing device 150 to execute the processing of the step S125 shown in FIG. 8, it is necessary for the feature extracted by the feature extracting device 130 to be able to specify the values corresponding to the background area that is obtained by the background specifying device 140. Further, when replacing the background components of the background area with random numbers by the background replacing device 150, it is not limited to the case where the background components are replaced with perfect random numbers. The background components may be replaced with values obtained by adding or subtracting the random numbers with respect to the values before being replaced. Furthermore, the random numbers to be used for replacement by the background replacing device 150 may be uniform random numbers or may be random numbers with a deviated distribution, such as normal distribution random numbers.

The background replacing device 150 saves, to the learning sample storage part 410, the object feature with the replaced background components obtained by the step S124 of FIG. 8 (step S126 of FIG. 8).

The identification parameter update device 510 reads out the feature data of the object (learning sample) from the learning sample storage part 410 (step S127 of FIG. 9), and updates the identification parameter that is kept in the identification parameter storage part 210 (step S128 of FIG. 9).

After the identification parameter update device 510 updates the identification parameter, the action of the object identification parameter learning system is initialized so as to be shifted to an initial action state (that is, the state capable of starting the image obtaining device 110 and the silhouette obtaining device 120).

As described above, the second exemplary embodiment of the present invention is not only capable of obtaining the effects of the first exemplary embodiment but also is advantageous in respect that it can update the identification parameter by using the learning samples saved during the operations of the past, since the feature data of the object can be saved as the learning samples.

Third Exemplary Embodiment

Next, a learning system 4 according to a third exemplary embodiment of the present invention will be described by referring to FIG. 10 and FIG. 11.

Figure 10:
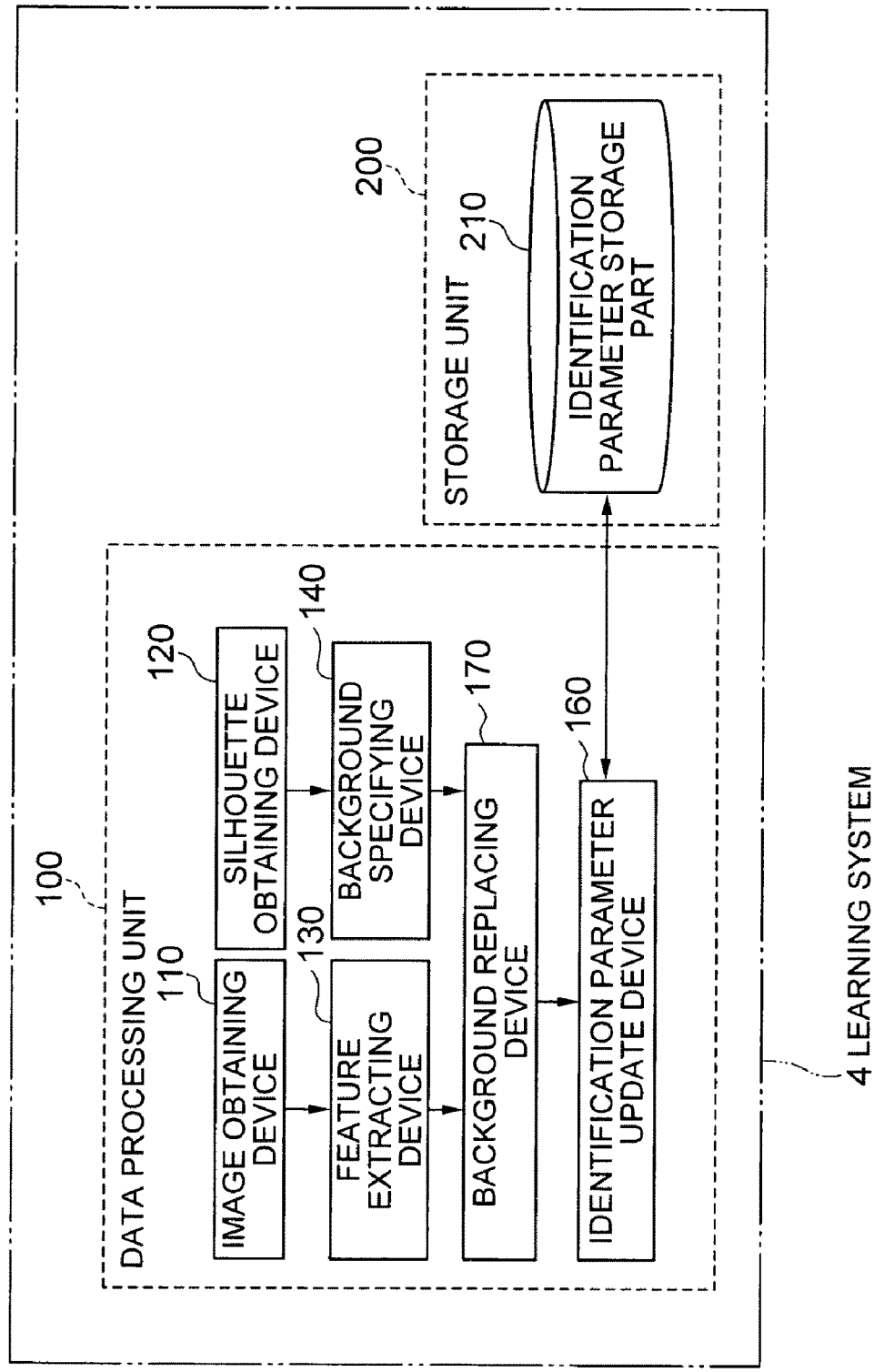
FIG. 10 is a block diagram for showing a structure of a third exemplary embodiment according to the present invention.

Compared to the structure of the learning system 2 according to the first exemplary embodiment of the present invention shown in FIG. 3, the learning system according to the third exemplary embodiment of the present invention shown in FIG. 10 is different in terms of the functions of the image obtaining device 110, the feature extracting device 130, and the background replacing device 150. That is, the image obtaining device 110, the feature extracting device 130, and the background replacing device 150 according to the third exemplary embodiment shown in FIG. 10 include additional functions with respect to the functions of the image obtaining device 110, the feature extracting device 130, and the background replacing device 150 according to the first exemplary embodiment shown in FIG. 3.

Figure 11:
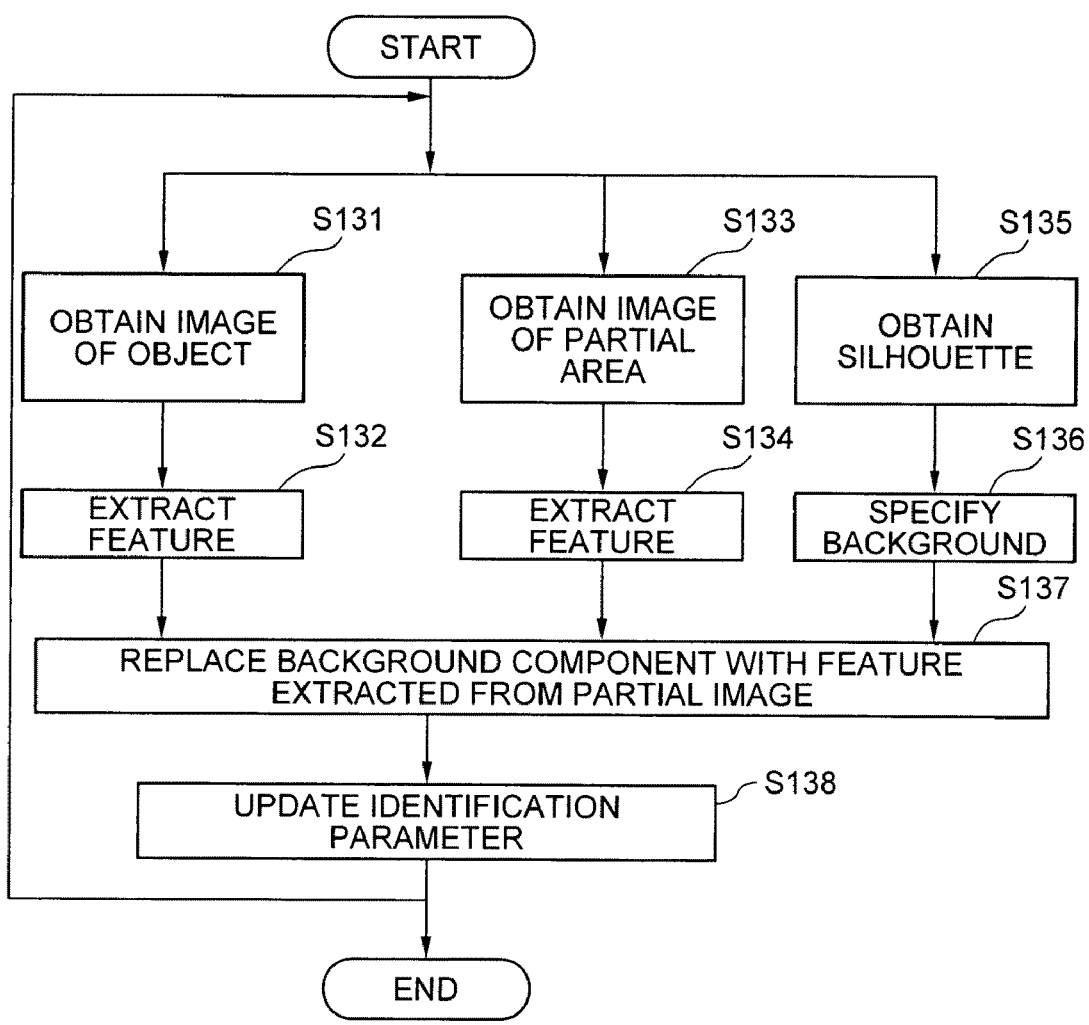
FIG. 11 is a flowchart for showing the operation of the third exemplary embodiment according to the present invention.

By referring to FIG. 10 and FIG. 11, there is described a case where the identification parameter for identifying the object within the image is learnt by using the feature of the object that is extracted from the image with the use of the object identification parameter learning system according to the third exemplary embodiment of the present invention that is shown in FIG. 10.

In FIG. 10, the image obtaining device 110 obtains an image of a partial area (partial image G1) that includes an object as a target to be identified (step S131 of FIG. 11).

Upon receiving the partial image (G1) from the image obtaining device 110, the feature extracting device 130 extracts an object feature for identifying the type of the object from the partial image (G1) (step S132 of FIG. 132).

In parallel to the above-described action (or before or after the action), the image obtaining device 110 obtains another partial area of the image (partial image G2) (step S133 of FIG. 11). In the process of the processing heretofore, the image obtaining device 110 obtains a partial image twice from the same image. The partial image obtained by the image obtaining device 110 in the step S131 of FIG. 11 is obtained by satisfying a condition to include the object of the identification target necessarily. The partial image obtained by the image obtaining device 110 in the step S133 of FIG. 11 may or may not include the object as the identification target. In order to distinguish the partial images obtained by the image obtaining device 110, the partial image obtained by the image obtaining device 110 in the step S131 of FIG. 11 is expressed as the partial image G1 in the explanations hereinafter, and the partial image obtained by the image obtaining device 110 in the step S133 of FIG. 11 is expressed as the partial image G2.

Upon receiving the partial image G2 from the image obtaining device 110, the feature extracting device 130 extracts the feature of the image from the partial image G2 (step S134 of FIG. 11).

In parallel to the above-described action (or before or after the action), the silhouette obtaining device 120 obtains the silhouette information of the object upon receiving the partial image G1 including the object (identification target) from the image obtaining device 110 (step S135 of FIG. 11).

Upon receiving the silhouette information from the silhouette obtaining device 120, the background specifying device 140 specifies the background area that is obtained by eliminating the object (identification target) from the silhouette information (step S136 of FIG. 11).

Next, relations regarding the partial images G1, G2 obtained by the image obtaining device 110, the feature data of the object B extracted by the feature extracting device 130, the feature data extracted from the partial image G2 by the feature extracting device 130, the silhouette information obtained by the silhouette obtaining device 120, and the background area information specified by the background specifying device 140 will be described in a specific way by referring to FIG. 12.

Figure 12:
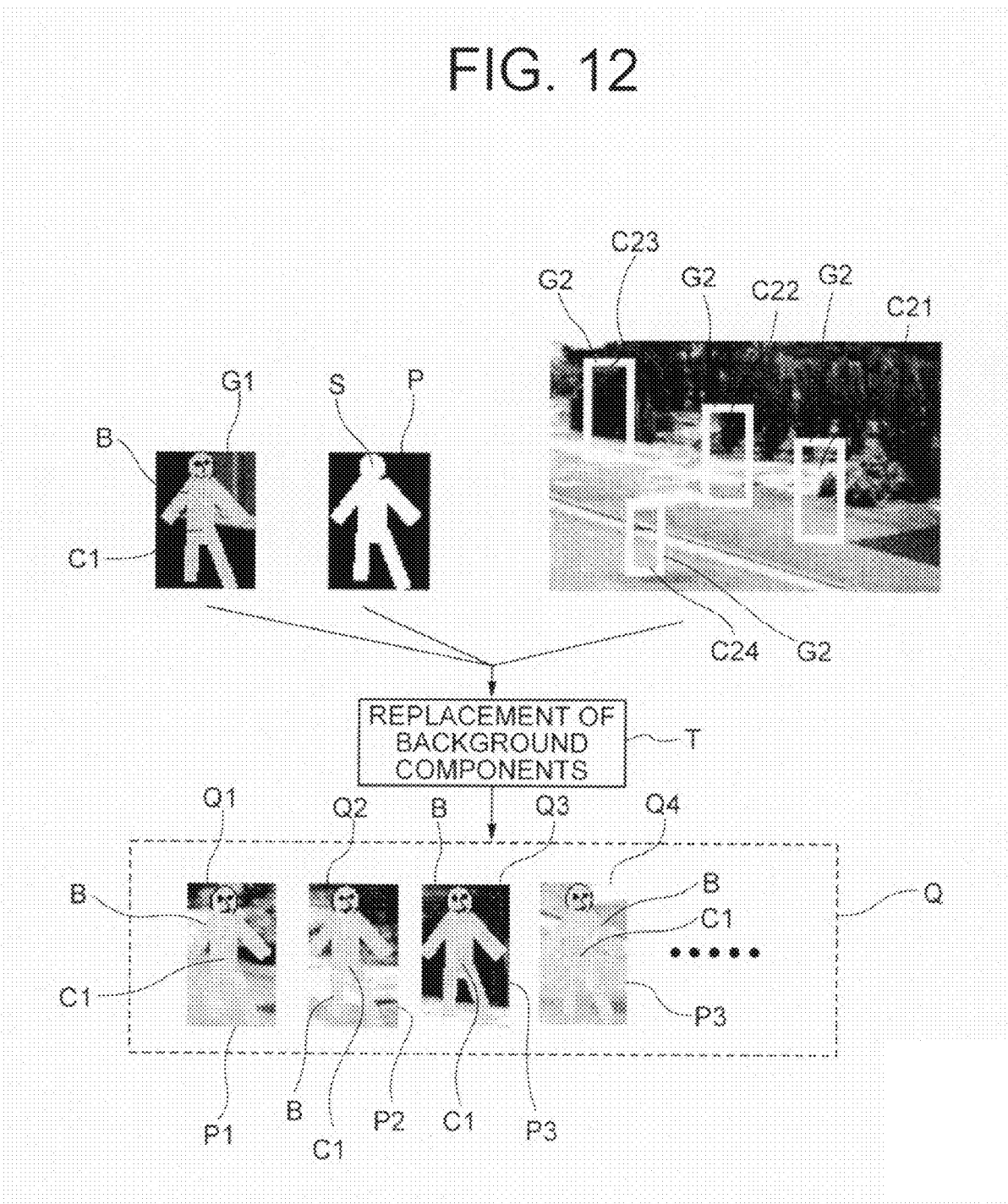
FIG. 12 is a schematic illustration for showing an example of the case where background components are replaced with components of a non-object area.

The partial image G1 obtained by the image obtaining device 110 is a rectangular image that circumscribes the object B shown in FIG. 12. The feature C1 of the object B extracted from the partial image G1 by the feature extracting device 130 is illustrated by changing the luminosity on the drawing of FIG. 12.

The partial image G2 obtained by the image obtaining device 110 is an image cut out from a single image shown in FIG. 12, and it is not necessary for the partial image G2 to include the object as the target to be identified. The feature C2 of the image G2 extracted from the partial image G2 by the feature extracting device 130 is a background in the case of FIG. 12. The silhouette information (image) S obtained by the silhouette obtaining device 120 is illustrated in white in FIG. 12. The background area P specified by the background specifying device 140 is illustrated in black in FIG. 12.

The silhouette image S is the information for judging whether an arbitrary point on the image is an object or a background. Thus, the silhouette information S is not limited to be in such a form that is shown in FIG. 12. For example, it may be in a form where black and white are inverted from those of FIG. 12, and the black area in the inverted state may be the silhouette information S and the white area may be the background area P. Further, the resolution of the silhouette information S shown in FIG. 12 may be lower than the resolution of the object B obtained in the partial image of FIG. 12.

The background replacing device 170 receives data regarding the feature C1 of the object B and the feature C2 of the image in the partial image G2 from the feature extracting device 130, and receives data of the specified background area from the background specifying device 140. The background replacing device 170 replaces the values that correspond to the background components of the background area of the feature C of the object B with the information of the feature C2 that is extracted from the partial image G2 (background component replacement T), and outputs the feature C1 of the object B with the replaced background area as a learning sample Q. The background replacing device 170 shown in FIG. 10 outputs, as the learning samples Q, a plurality of kinds of features C1 of the object B shown in FIG. 12 where the background area is replaced (step S137 of FIG. 11).

Specifically, in a learning sample Q1 among the learning samples Q, the black background area P of the partial image G1 is replaced with a background area P1 by using a feature C21 of the image of the partial image G2. In a learning sample Q2, the black background area P of the partial image G1 is replaced with a background area P2 by using a feature C22 of the image of the partial image G2. In a learning sample Q3, the black background area P of the partial image G1 is replaced with a background area P3 by using a feature C23 of the image of the partial image G2. In a learning sample Q4, the black background area P of the partial image G1 is replaced with a background area P4 by using a feature C24 of the image of the partial image G2. The learning samples Q are not limited to the four kinds of learning samples Q1, Q2, Q3, and Q4 shown in FIG. 12. Further, for replacing the feature of the background area with the features C21, C22, C23, and C24 of the other partial image G2 in the image shown in FIG. 12, a moving picture is used as the partial image G2. However, a still picture may be used instead of the moving picture.

In order to execute the action performed in the step S137, it is necessary for the features extracted in the steps S132 and S134 to be able to specify the values that correspond to the background area that is specified in the step S136.

FIG. 12 is a schematic illustration showing the action of the step S137 to replace the background components of the feature including the object with other background components.

FIG. 12 shows the case where the gradation values of each pixel of the image are used directly as the features for performing identification.

Upon receiving the learning samples Q from the background replacing device 170, the identification parameter update device 160 updates the identification parameter kept in the identification parameter storage part 210 by using the feature data of the object with the replaced background components obtained in the step S137 of FIG. 11 (step S138 of FIG. 11).

The identification parameter update device 510 reads out the feature data of the object (learning sample) from the learning sample storage part 410 (step S127 of FIG. 9), and updates the identification parameter that is kept in the identification parameter storage part 210 (step S128 of FIG. 9).

After the identification parameter update device 510 updates the identification parameter, the action of the object identification parameter learning system is initialized so as to be shifted to an initial action state (that is, the state capable of starting the image obtaining device 110 and the silhouette obtaining device 120).

The identification parameter update device 160 updates the identification parameter for identifying the object based on the learning samples outputted from the background replacing device 150 (step S138 of FIG. 11), and outputs the updated identification parameter to the identification parameter storage part 210 of the storage unit 200. The identification parameter storage part 210 of the storage unit 200 keeps the identification parameter that is used for identification.

After the identification parameter update device 160 updates the identification parameter, the action of the object identification parameter learning system is initialized so as to be shifted to an initial action state (that is, the state capable of starting the processing of the steps S131, S133, and S135 shown in FIG. 11).

Further, in FIG. 11, the identification parameter update device 160 updates, in the step S138, the identification parameter by using one or more pieces of feature data outputted in the step S137. However, it is not limited to such case. For example, it is also possible to output the learning samples Q1, Q2, Q3, and Q4 shown in FIG. 11 with a time lag from each other for the feature data of a single object, and to update the identification parameter by each of the learning samples Q1, Q2, Q3, and Q4.

With the third exemplary embodiment of the present invention as described above, it is possible not only to achieve the effects of the first exemplary embodiment but also to learn the identification parameter so as to be able to deal with the case where an object is at a different place from the object inputted in the step S131, since the data to be used for replacement as the background components by the background replacing device 170 is a partial image cut out from the video.

Fourth Exemplary Embodiment

Next, an object identification parameter learning system according to a fourth exemplary embodiment of the present invention will be described.

The object identification parameter learning system according to the fourth exemplary embodiment of the present invention is configured by adding the function of the background replacing device 170 according to the third exemplary embodiment show in FIG. 10 to the function of the background replacing device 150 according to the second exemplary embodiment shown in FIG. 7.

There is described a case where the identification parameter for identifying the object within the image is learnt by using the feature of the object that is extracted from the image with the use of the object identification parameter learning system according to the fourth exemplary embodiment of the present invention.

Figure 13:
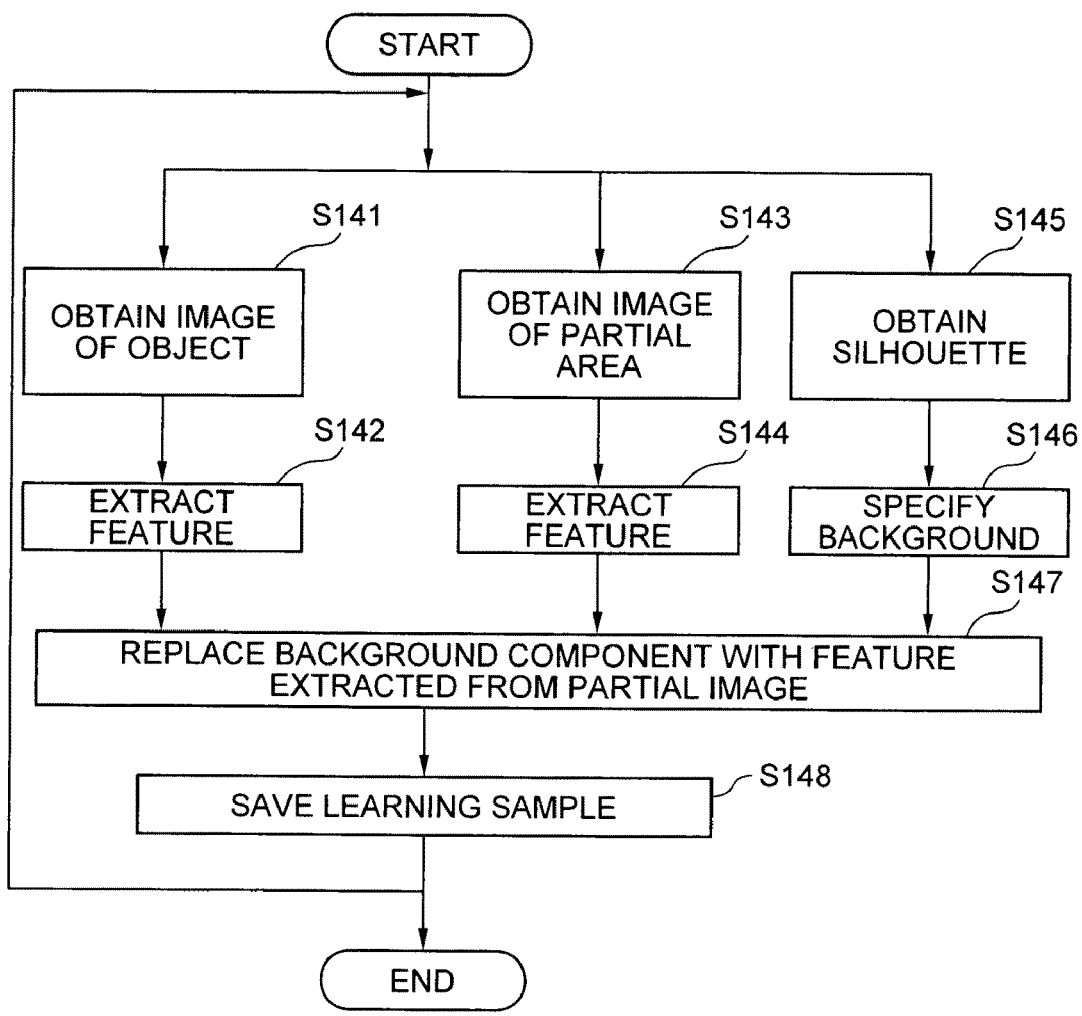
FIG. 13 is a flowchart for showing the operation of a fourth exemplary embodiment according to the present invention.

The object identification parameter learning system according to the fourth exemplary embodiment of the present invention executes the processing shown in FIG. 13 and the processing shown in FIG. 9. The processing of FIG. 13 is an operation for generating and saving the learning samples for updating the identification parameter, and the processing of FIG. 9 is an operation for updating the identification parameter by reading out the saved learning samples.

In FIG. 13, the image obtaining device 110 obtains an image of a partial area (partial image G1) that includes an object as a target to be identified (step S141 of FIG. 13).

Upon receiving the partial image (G1) from the image obtaining device 110, the feature extracting device 130 extracts the object feature for identifying the type of the object from the partial image (G1) (step S142 of FIG. 13).

In parallel to the above-described action (or before or after the action), the image obtaining device 110 obtains an image of another partial area (partial image G2) (step S143 of FIG. 13). In the process of the processing heretofore, the image obtaining device 110 obtains a partial image twice from the same image. The partial image obtained by the image obtaining device 110 in the step S141 of FIG. 13 is obtained by satisfying a condition to include the object of the identification target necessarily. The partial image obtained by the image obtaining device 110 in the step S143 of FIG. 13 may or may not include the object as the identification target. In order to distinguish the partial images obtained by the image obtaining device 110, the partial image obtained by the image obtaining device 110 in the step S141 of FIG. 13 is expressed as the partial image G1 in the explanations hereinafter, and the partial image obtained by the image obtaining device 110 in the step S143 of FIG. 13 is expressed as the partial image G2.

Upon receiving the partial image G2 from the image obtaining device 110, the feature extracting device 130 extracts the feature of the image from the partial image G2 (step S144 of FIG. 13).

In parallel to the above-described action (or before or after the action), the silhouette obtaining device 120 obtains the silhouette information of the object upon receiving the partial image G1 including the object (identification target) from the image obtaining device 110 (step S145 of FIG. 13).

Upon receiving the silhouette information from the silhouette obtaining device 120, the background specifying device 140 specifies the background area that is obtained by eliminating the object (identification target) from the silhouette information (step S146 of FIG. 13).

Next, relations regarding the partial images G1, G2 obtained by the image obtaining device 110, the feature data of the object B extracted by the feature extracting device 130, the feature data extracted from the partial image G2 by the feature extracting device 130, the silhouette information obtained by the silhouette obtaining device 120, and the background area information specified by the background specifying device 140 will be described in a specific way by referring to FIG. 12.

The partial image G1 obtained by the image obtaining device 110 is a rectangular image that circumscribes the object B shown in FIG. 12. The feature C1 of the object B extracted from the partial image G1 by the feature extracting device 130 is illustrated by changing the luminosity on the drawing of FIG. 12.

The partial image G2 obtained by the image obtaining device 110 is an image cut out from a single image shown in FIG. 12, and it is not necessary for the partial image G2 to include the object as the target to be identified. The feature C2 of the image G2 that is extracted from the partial image G2 by the feature extracting device 130 is a background in the case of FIG. 12. The silhouette information (image) S obtained by the silhouette obtaining device 120 is illustrated in white in FIG. 12. The background area P specified by the background specifying device 140 is illustrated in black in FIG. 12.

The silhouette image S is the information for judging whether an arbitrary point on the image is an object or a background. Thus, the silhouette information S is not limited to be in such a form that is shown in FIG. 12. For example, it may be in a form where black and white are inverted from those of FIG. 12, and the black area in the inverted state may be the silhouette information S and the white area may be the background area P. Further, the resolution of the silhouette information S shown in FIG. 12 may be lower than the resolution of the object B obtained in the partial image of FIG. 12.

The background replacing device 170 receives data regarding the feature C1 of the object B and the feature C2 of the image in the partial image G2 from the feature extracting device 130, and receives data of the specified background area from the background specifying device 140. The background replacing device 170 replaces the values that correspond to the background components of the background area of the feature C of the object B with the information of the feature C2 that is extracted from the partial image G2 (background component replacement T), and outputs the feature of the object B with the replaced background area as a learning sample Q. The background replacing device 170 shown in FIG. 10 outputs, as the learning samples Q, a plurality of kinds of features C1 of the object B shown in FIG. 12 where the background area is replaced (step S134 of FIG. 13).

Specifically, regarding a learning sample Q1 among the learning samples Q, the black background area P of the partial image G1 is replaced with a background area P1 by using a feature C21 of the image of the partial image G2. In a learning sample Q2, the black background area P of the partial image G1 is replaced with a background area P2 by using a feature C22 of the image of the partial image G2. In a learning sample Q3, the black background area P of the partial image G1 is replaced with a background area P3 by using a feature C23 of the image of the partial image G2. In a learning sample Q4, the black background area P of the partial image G1 is replaced with a background area P4 by using a feature C24 of the image of the partial image G2. The learning samples Q are not limited to the four kinds of learning samples Q1, Q2, Q3, and Q4 shown in FIG. 12.

In order to execute the processing of the step S147, it is necessary for the features extracted in the steps S142 and S144 to be able to specify the values that correspond to the background area that is specified in the step S146.

The identification parameter update device 510 reads out the feature data of the object (learning sample) from the learning sample storage part 410 (step S127 of FIG. 9), and updates the identification parameter that is kept in the identification parameter storage part 210 (step S128 of FIG. 9).

After the identification parameter update device 510 updates the identification parameter, the action of the object identification parameter learning system is initialized so as to be shifted to an initial action state (that is, the state capable of starting the image obtaining device 110 and the silhouette obtaining device 120).

Upon receiving the learning samples Q from the background replacing device 170, the identification parameter update device 160 updates the identification parameter kept in the identification parameter storage part 210 by using the feature data of the object with the replaced background components obtained in the step S147 of FIG. 13 (step S148 of FIG. 13).

The identification parameter update device 160 updates the identification parameter for identifying the object based on the learning samples outputted from the background replacing device 150 (step S138 of FIG. 11), and outputs the updated identification parameter to the identification parameter storage part 210 of the storage unit 200. The identification parameter storage part 210 of the storage unit 200 keeps the identification parameter that is used for identification.

After the identification parameter update device 160 updates the identification parameter, the action of the object identification parameter learning system is initialized so as to be shifted to an initial action state (that is, the state capable of starting the processing of the steps S131, S133, and S135 shown in FIG. 11).

Further, in FIG. 11, the identification parameter update device 160 updates, in the step S138, the identification parameter by using one or more pieces of feature data outputted in the step S137. However, it is not limited to that. For example, it is also possible to output the learning samples Q1, Q2, Q3, and Q4 shown in FIG. 11 with a time lag from each other for the feature data of a single object, and to update the identification parameter by each of the learning samples Q1, Q2, Q3, and Q4.

With the fourth exemplary embodiment of the present invention as described above, it is possible to obtain both the effects of the second exemplary embodiment and the effects of the third exemplary embodiment at the same time.

Example 1

Next, the structure and the action of the first exemplary embodiment for embodying the present invention will be described by referring to a specific example.

In the first exemplary embodiment of the present invention shown in FIG. 3, the data processing unit 100 can be achieved by a CPU (Central Processing Unit), and the storage unit 200 can be achieved by a semiconductor memory or a hard disk drive. The image obtaining device 110, the silhouette obtaining device 120, the feature extracting device 130, the background specifying device 140, the background replacing device 150, and the identification parameter update device 160 can be achieved by the programs executed on the CPU, and the identification parameter storage part 210 can be achieved by a storage area on the semiconductor memory or the hard disk drive.

The image obtaining device 110 obtains an image in a rectangular shape area that circumscribes the object. The silhouette obtaining device 120 obtains the silhouette of the object as a binary image. The feature extracting device 130 obtains differential intensity images from the object image as the feature of the object (identification target) based on the concentration gradient for the number of each direction by using the Sobel operator. The background specifying device 140 inverts the binary image of the silhouette obtained by the silhouette obtaining device 120 so as to obtain the background area other than the object.

For the differential intensity images that are the features of the object obtained by the feature extracting device 130, the background replacing device 150 adds/subtracts, as noises, uniform random numbers (whose upper and lower limits are set) with respect to differential intensity values of the area that corresponds to the background area specified by the background specifying device 140. At that time, a large amount of different feature data is generated by changing the values of the random numbers. For example, a hundred pieces of feature data with the replaced background areas may be generated from a single piece of feature data.

Figure 14:
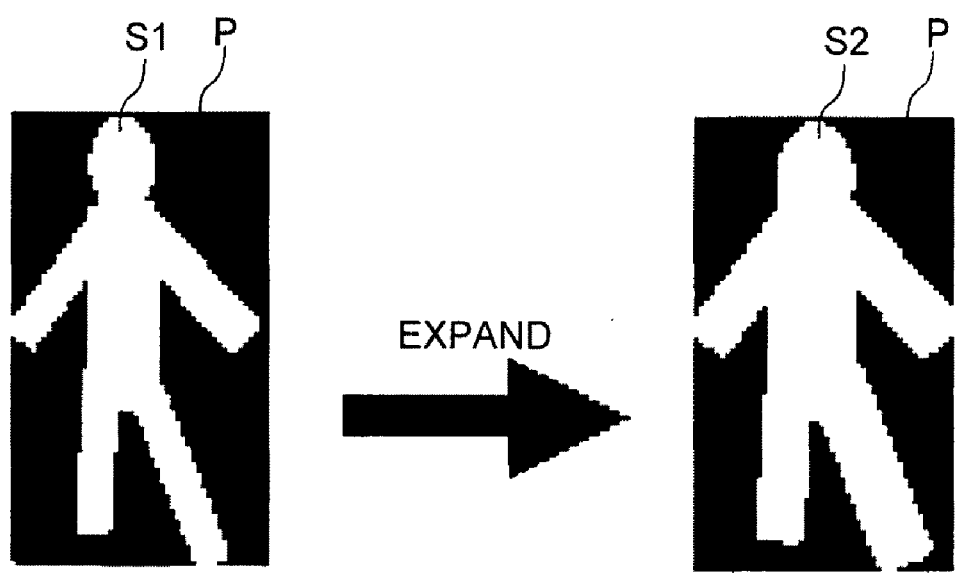
FIG. 14 is a schematic illustration for showing an example of the case where the silhouette of the object is expanded.

The background area obtained by the background specifying device 140 can be narrowed through expanding the area of the silhouette S2 as illustrated in FIG. 14 by applying expansion processing on the silhouette image S1 that is obtained by the silhouette obtaining device 120. Thus, the differential intensity feature on the boundary line between the object and the background can be maintained securely. The expansion processing is processing executed on a binary image, in which such processing (i.e. if a pixel on a certain point is not "0", the peripheral pixels are replaced with "1") is executed over the entire image. When the silhouette image is inverted from the case shown in FIG. 14, the background area can be narrowed through applying contraction processing in the same manner.

The identification parameter update device 160 updates the value of the identification parameter by having the group of differential intensity images obtained by the background replacing device 150 as the features. When the generalized learning vector quantization depicted in Non-patent Document 3 is used for learning the type of the object, the identification parameter is the quantized reference vector.

When the structure of this EXAMPLE is employed, identification can be performed even if it is not a moving picture of an object but a still picture, when identification is performed by using the learnt identification parameter. The reason for this is that the features of the object can be extracted from a single piece of image.

Moreover, it is possible to identify the type of the object without replacing the background components by using the silhouette information, when performing identification by using the learnt identification parameter. The reason for this is that it is possible to express the appearance of the object in many kinds of backgrounds by replacing the background components, so that it is possible to automatically learn the identification parameter that has less dependency on the background components with the use of the generalized learning vector quantization.

Next, the structure and the action for achieving the second exemplary embodiment of the present invention will be described by referring to a specific example.

In the second exemplary embodiment of the present invention shown in FIG. 7, the data processing units 100 and 500 can be achieved by a CPU, and the storage units 200 and 400 can be achieved by a semiconductor memory or a hard disk drive, respectively. The image obtaining device 110, the silhouette obtaining device 120, the feature extracting device 130, the background specifying device 140, the background replacing device 150, and the identification parameter update device 510 can be achieved by the programs executed on the CPU, and the identification parameter storage part 210 and the learning sample storage part can be achieved by a storage area on the semiconductor memory or the hard disk drive.

The actions of each device of this embodiment (regarding the devices in common to the first exemplary embodiment) are the same as those of the first exemplary embodiment. However, there are differences in two respects that: the features where the background components are replaced by the background replacing device 150 are recorded and stored in the learning sample storage part 410 as the learning samples; and the identification parameter is updated by reading the stored learning samples when learning the identification parameter.

Thus, from the large amount of learning samples saved through the flow of FIG. 8, improper learning samples may be selected and cancelled by visual inspection of a human being, for example. Further, after executing the flow of FIG. 8 by dividing it to the processing of a plurality of times, the saved learning samples may be combined to execute the identification parameter learning processing shown in FIG. 9.

Next, the structure and the action of the third exemplary embodiment of the present invention will be described by referring to a specific example.

In the third exemplary embodiment of the present invention shown in FIG. 10, the data processing unit 100 can be achieved by a CPU, and the storage unit 200 can be achieved by a semiconductor memory or a hard disk drive. The image obtaining device 110, the silhouette obtaining device 120, the feature extracting device 130, the background specifying device 140, the background replacing device 170, and the identification parameter update device 160 can be achieved by the programs executed on the CPU, and the identification parameter storage part 210 can be achieved by a storage area on the semiconductor memory or the hard disk drive.

The actions of each device according to the third exemplary embodiment of the present invention are the same as those illustrated in EXAMPLE of the first exemplary embodiment, except for the background replacing device 170. The background replacing device 170 compares the silhouette image, the differential intensity images of the object, and the differential intensity images obtained from an arbitrary image, and replaces the background area components of the differential intensity image values of the object with the components that correspond to the differential intensity images obtained from the arbitrary image. When replacing the values, random numbers may be added/subtracted further as in EXAMPLE of the first exemplary embodiment.

Next, another exemplary embodiment of the present invention will be described point by point.

An object identification parameter learning system according to this exemplary embodiment of the present invention may include: a feature extracting device for obtaining a feature of an object from an image; a background specifying device for specifying a background area of the image; a background replacing device for replacing the feature components that correspond to the background area of the feature with other values; and an identification parameter update device for updating an identification parameter by using the feature replaced by the background replacing device.

The above-described parameter learning system is configured to learn the identification parameter by utilizing the feature data where the background of the object is replaced. Thus, it is possible to obtain the identification parameter while suppressing the influence of changes in the background. Further, since the identification is performed statistically by using a large amount of information such as the image and the silhouette of the object for the identification, a high identification performance can be achieved.

In the above-described object identification parameter learning system, the processing by the feature extracting device, the background specifying device, the background replacing device, and the identification parameter update device may be executed for each inputted object image.

In the above-described object identification parameter learning system, the identification parameter may be updated by the identification parameter update device by using a plurality of replaced features, after obtaining the plurality of replaced features through executing the processing by the feature extracting device, the background specifying device, and the background replacing device on a plurality of inputted object images.

In the above-described object identification parameter learning system, the background replacing device may generate a plurality of features (where the feature components corresponding to the background area are replaced) from a single feature that is inputted to the background replacing device.

In the above-described object identification parameter learning system, the background specifying device may specify the area other than the silhouette of the object as a background area by using a silhouette image of the object.

In this structure, the identification parameter is updated by using the features that are extracted based on the image and the silhouette of the object. Thus, it is possible to obtain a higher identification performance than the case of simply using the size of the object or the aspect ratio. Moreover, it is possible to perform identification of the objects other than the specific objects such as a pedestrian and a vehicle.

In the above-described object identification parameter learning system, the background specifying device may specify the background area by using an image that is obtained by applying expansion processing or contraction processing on the silhouette image.

This makes it possible to narrow the background area, so that the feature on the boundary line between the object and the background can be maintained securely.

In the above-described object identification parameter learning system, the background replacing device may replace the feature components that correspond to the background area with random numbers.

In the above-described object identification parameter learning system, the background replacing device may replace the feature components that correspond to the background area by adding/subtracting random numbers with respect to the original values.

In the above-described object identification parameter learning system, the background replacing device may replace the feature components that correspond to the background area with feature values that are obtained from an image that is different from the image of the object.

In the above-described object identification parameter learning system, the background replacing device may replace the feature components that correspond to the background area with feature values that are obtained from a partial image of a moving picture where the object is filmed.

With this, it is possible to learn the identification parameter so as to be able to deal with the case where the object is at another position, since the data to be replaced as the background components is a partial image cut out from the video.

In the above-described object identification parameter learning system, the background replacing device may replace the feature components that correspond to the background area with feature values that are obtained from an area that is different from an object image of a still picture where the object is photographed.

In the above-described object identification parameter learning system, the background replacing device may replace the feature components that correspond to the background area with values obtained by adding/subtracting random numbers further with respect to the replaced values.

An object identification parameter learning method according to this exemplary embodiment of the present invention may include: a feature extracting step for obtaining the feature of an object from an image; a background specifying step for specifying a background area of the image; a background replacing step for replacing the feature components that correspond to the background area of the feature with other values; and an identification parameter update step for updating an identification parameter by using the feature replaced by the background replacing step.

With the aforementioned object identification parameter learning method, it is possible to achieve the same effects as those of the above-described parameter learning system.

In the above-described object identification parameter learning method, the feature extracting step, the background specifying step, the background replacing step, and the identification parameter update step may be executed for each inputted object image.

In the above-described object identification parameter learning method, the identification parameter may be updated by the identification parameter update step by using a plurality of replaced features, after obtaining the plurality of replaced features through executing the processing of the feature extracting step, the background specifying step, and the background replacing step on a plurality of inputted object images.

In the background replacing step of the above-described object identification parameter learning method, a plurality of features (where the features components corresponding to the background area are replaced) may be generated from a single feature that is inputted in the background replacing step.

In the background specifying step of the above-described object identification parameter learning method, an area other than the silhouette of the object may be specified as a background area by using a silhouette image of the object.

In the background specifying step of the above-described object identification parameter learning method, the background area may be specified by using an image that is obtained by applying expansion processing or contraction processing on the silhouette image.

In the background replacing step of the above-described object identification parameter learning method, the feature components that correspond to the background area may be replaced with random numbers.

In the background replacing step of the above-described object identification parameter learning method, the feature components that correspond to the background area may be replaced by adding/subtracting random numbers with respect to the original values.

In the background replacing step of the above-described object identification parameter learning method, the feature components that correspond to the background area may be replaced with feature values that are obtained from an image that is different from the image of the object.

In the background replacing step of the above-described object identification parameter learning method, the feature components that correspond to the background area may be replaced with feature values that are obtained from a partial image of a moving picture where the object is filmed.

In the background replacing step of the above-described object identification parameter learning method, the feature components that correspond to the background area may be replaced with feature values that are obtained from an area that is different from an object image of a still picture where the object is photographed.

In the background replacing step of the above-described object identification parameter learning method, the feature components that correspond to the background area may be replaced with values obtained by adding/subtracting random numbers further with respect to the replaced values.

An object identification parameter learning program according to this exemplary embodiment of the present invention may be configured to allow a computer to execute: feature extracting processing for obtaining a feature of an object from an image; a background specifying processing for specifying a background area of the image; a background replacing processing for replacing the feature components that correspond to the background area of the feature with other values; and an identification parameter update processing for updating an identification parameter by using the feature replaced by the background replacing processing.

With the aforementioned object identification parameter learning program, it is possible to achieve the same effects as those of the above-described parameter learning system.

With the above-described object identification parameter learning program, the computer may execute the feature extracting processing, the background specifying processing, the background replacing processing, and the identification parameter update processing for each inputted object image.

With the above-described object identification parameter learning program, the computer may execute the identification parameter update processing by using a plurality of replaced features, after executing the feature extracting processing, the background specifying processing, and the background replacing processing on a plurality of inputted object images to obtain the plurality of replaced features.

With the above-described object identification parameter learning program, in the background replacing processing, a plurality of features (where the features components corresponding to the background area are replaced) may be generated from a single feature that is inputted in the background replacing processing.

With the above-described object identification parameter learning program, in the background specifying processing, an area other than the silhouette of the object may be specified as a background area by using a silhouette image of the object.

With the above-described object identification parameter learning program, in the background specifying processing, the background area may be specified by using an image that is obtained by applying expansion processing or contraction processing on the silhouette image.

With the above-described object identification parameter learning program, in the background replacing processing, the feature components that correspond to the background area may be replaced with random numbers.

With the above-described object identification parameter learning program, in the background replacing processing, the feature components that correspond to the background area may be replaced by adding/subtracting random numbers with respect to the original values.

With the above-described object identification parameter learning program, in the background replacing processing, the feature components that correspond to the background area may be replaced with feature values that are obtained from an image that is different from the image of the object.

With the above-described object identification parameter learning program, in the background replacing processing, the feature components that correspond to the background area may be replaced with feature values that are obtained from a partial image of a moving picture where the object is filmed.

With the above-described object identification parameter learning program, in the background replacing processing, the feature components that correspond to the background area may be replaced with feature values that are obtained from an area that is different from an object image of a still picture where the object is photographed.

With the above-described object identification parameter learning program, in the background replacing processing, the feature components that correspond to the background area may be replaced with values obtained by adding/subtracting random numbers further with respect to the replaced values.

The present invention can be applied to the case of monitoring the behaviors of objects such as a person and an automobile. Further, it can also be applied to the case of researching people passing by a certain road and researching a traffic volume of auto mobiles. Furthermore, it can be applied to the case of searching an image including a person, an automobile, or a bird from a large amount of images. Moreover, the present invention can also be applied to the case of detecting a person in a specific costume, by setting the type to be identified as the costume of a person. Further, it can also be applied to the case of confirming the identity of a person by setting the type to be identified as an individual. Furthermore, it can also be applied to the case of managing flows of commodities within a warehouse based on the types of the commodities.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An object identification parameter learning system for learning an identification parameter used for identifying an object in an image by using a feature of the object extracted from the image, the system comprising:
   a feature extracting device for extracting the feature of the object from the image;
   a background specifying device for specifying a background area of the image from which the object as an identification target is eliminated;
   a background replacing device which outputs a plurality of kinds of features of the object as learning samples by replacing feature components of the background area with feature components of a partial image of a moving picture where the object is filmed for the extracted feature of the object; and
   an identification parameter update device for updating the identification parameter used for identifying the object based on the learning sample.

2. The object identification parameter learning system as claimed in claim 1, wherein the background replacing device specifies the background area by using a silhouette image of the object.

3. An object identification parameter learning system for learning an identification parameter used for identifying an object in an image by using a feature of the object extracted from the image, the system comprising:
   a feature extracting device for extracting the feature of the object from the image;
   a background specifying device for specifying a background area of the image from which the object as an identification target is eliminated;
   a background replacing device which outputs a plurality of kinds of features of the object as learning samples by replacing feature components of the background area with feature components of an image other than the object in a still picture where the object is photographed for the extracted feature of the object; and an identification parameter update device for updating the identification parameter used for identifying the object based on the learning sample.

4. The object identification parameter learning system as claimed in claim 3, wherein the background replacing device specifies the background area by using a silhouette image of the object.

5. An object identification parameter learning system for learning an identification parameter used for identifying an object in an image by using a feature of the object extracted from the image, the system comprising:
a feature extracting device for extracting the feature of the object from the image;
a background specifying device for specifying a background area of the image from which the object as an identification target is eliminated;
a background replacing device which outputs a plurality of kinds of features of the object as learning samples by replacing the components that correspond to the background area with values obtained by adding/subtracting random numbers further with respect to the replaced feature values for the extracted feature of the object; and
an identification parameter update device for updating the identification parameter used for identifying the object based on the learning sample.

6. The object identification parameter learning system as claimed in claim 5, wherein the background replacing device specifies the background area by using a silhouette image of the object.

7. An object identification parameter learning system for learning an identification parameter used for identifying an object in an image by using a feature of the object extracted from the image, the system comprising:
a feature extracting means for extracting the feature of the object from the image;
a background specifying means for specifying a background area of the image from which the object as an identification target is eliminated;
a background replacing means which outputs a plurality of kinds of features of the object as learning samples by replacing feature components of the background area with feature components of a partial image of a moving picture where the object is filmed for the extracted feature of the object; and
an identification parameter update means for updating the identification parameter used for identifying the object based on the learning sample.

8. An object identification parameter learning system for learning an identification parameter used for identifying an object in an image by using a feature of the object extracted from the image, the system comprising:
a feature extracting means for extracting the feature of the object from the image;
a background specifying means for specifying a background area of the image from which the object as an identification target is eliminated;
a background replacing means which outputs a plurality of kinds of features of the object as learning samples by replacing feature components of the background area with feature components of an image other than the object in a still picture where the object is photographed for the extracted feature of the object; and
an identification parameter update means for updating the identification parameter used for identifying the object based on the learning sample.

9. An object identification parameter learning system for learning an identification parameter used for identifying an object in an image by using a feature of the object extracted from the image, the system comprising:
a feature extracting means for extracting the feature of the object from the image;
a background specifying means for specifying a background area of the image from which the object as an identification target is eliminated;
a background replacing means which outputs a plurality of kinds of features of the object as learning samples by replacing the components that correspond to the background area with values obtained by adding/subtracting random numbers further with respect to the replaced feature values for the extracted feature of the object; and
an identification parameter update means for updating the identification parameter used for identifying the object based on the learning sample.

10. A non-transitory computer readable storage medium storing an object identification parameter learning program for allowing a computer, which configures an identification parameter learning system for learning an identification parameter used for identifying an object in an image by using a feature of the object extracted from the image, to execute:
a function for extracting the feature of the object from the image;
a function for specifying a background area of the image from which the object as an identification target is eliminated;
a function for outputting a plurality of kinds of features of the object as learning samples by replacing feature components of the background area with feature components of a partial image of a moving picture where the object is filmed for the extracted feature of the object; and
a function for updating the identification parameter used for identifying the object based on the learning sample.

11. The non-transitory computer readable storage medium as claimed in claim 10, wherein the object identification parameter learning program further allows the computer to execute a function for specifying the background area by using a silhouette image of the object.

12. A non-transitory computer readable storage medium storing an object identification parameter learning program for allowing a computer, which configures an identification parameter learning system for learning an identification parameter used for identifying an object in an image by using a feature of the object extracted from the image, to execute:
a function for extracting the feature of the object from the image;
a function for specifying a background area of the image from which the object as an identification target is eliminated;
a function for outputting a plurality of kinds of features of the object as learning samples by replacing feature components of the background area with feature components of an image other than the object in a still picture where the object is photographed for the extracted feature of the object; and
a function for updating the identification parameter used for identifying the object based on the learning sample.

13. The non-transitory computer readable storage medium as claimed in claim 12, wherein the object identification parameter learning program further allows the computer to execute a function for specifying the background area by using a silhouette image of the object.

14. A non-transitory computer readable storage medium storing an object identification parameter learning program for allowing a computer, which configures an identification parameter learning system for learning an identification parameter used for identifying an object in an image by using a feature of the object extracted from the image, to execute:
- a function for extracting the feature of the object from the image;
- a function for specifying a background area of the image from which the object as an identification target is eliminated;
- a function for outputting a plurality of kinds of features of the object as learning samples by replacing the components that correspond to the background area with values obtained by adding/subtracting random numbers further with respect to the replaced feature values for the extracted feature of the object; and
- a function for updating the identification parameter used for identifying the object based on the learning sample.

15. The non-transitory computer readable storage medium as claimed in claim 14, wherein the object identification parameter learning program further allows the computer to execute a function for specifying the background area by using a silhouette image of the object.

16. A learning method for learning an identification parameter used for identifying an object in an image by using a feature of the object extracted from the image, the method comprising:
- extracting the feature of the object from the image by using a computer;
- specifying a background area of the image from which the object as an identification target is eliminated;
- outputting a plurality of kinds of features of the object as learning samples by replacing feature components of the background area with feature components of a partial image of a moving picture where the object is filmed for the extracted feature of the object; and
- updating the identification parameter used for identifying the object based on the learning sample.

17. The learning method as claimed in claim 16, further comprising:
- specifying the background area by using a silhouette image of the object.

18. A learning method for learning an identification parameter used for identifying an object in an image by using a feature of the object extracted from the image, the method comprising:
- extracting the feature of the object from the image by using a computer;
- specifying a background area of the image from which the object as an identification target is eliminated;
- outputting a plurality of kinds of features of the object as learning samples by replacing feature components of the background area with feature components of an image other than the object in a still picture where the object is photographed for the extracted feature of the object; and
- updating the identification parameter used for identifying the object based on the learning sample.

19. The learning method as claimed in claim 18, further comprising:
- specifying the background area by using a silhouette image of the object.

20. A learning method for learning an identification parameter used for identifying an object in an image by using a feature of the object extracted from the image, the method comprising:
- extracting the feature of the object from the image by using a computer;
- specifying a background area of the image from which the object as an identification target is eliminated;
- outputting a plurality of kinds of features of the object as learning samples by replacing the components that correspond to the background area with values obtained by adding/subtracting random numbers further with respect to the replaced feature values for the extracted feature of the object; and
- updating the identification parameter used for identifying the object based on the learning sample.

21. The learning method as claimed in claim 20, further comprising:
- specifying the background area by using a silhouette image of the object.

22. The object identification parameter learning system as claimed in claim 2, wherein the silhouette image comprises information for judging whether an arbitrary point on the image comprises the object or the background area.

23. The object identification parameter learning system as claimed in claim 2, wherein a resolution of the silhouette image is lower than a resolution of the object filmed in the partial image.

24. The object identification parameter learning system as claimed in claim 1, wherein in each of said learning samples, the background area of the partial image is replaced with another background area by using a corresponding feature component of said feature components of the partial image.

25. The object identification parameter learning system as claimed in claim 1, wherein gradation values of each pixel of the image are used for said identifying the object.

* * * * *